US009632842B2

(12) United States Patent
Suzuki et al.

(10) Patent No.: US 9,632,842 B2
(45) Date of Patent: Apr. 25, 2017

(54) EXCLUSIVE ACCESS CONTROL METHOD PROHIBITING ATTEMPT TO ACCESS A SHARED RESOURCE BASED ON AVERAGE NUMBER OF ATTEMPTS AND PREDETERMINED THRESHOLD

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 401 days.

(21) Appl. No.: 14/036,272

(22) Filed: Sep. 25, 2013

(65) Prior Publication Data

US 2014/0026143 A1 Jan. 23, 2014

Related U.S. Application Data

(63) Continuation of application No. PCT/JP2011/058359, filed on Mar. 31, 2011.

(51) Int. Cl.
*G06F 9/52* (2006.01)
*G06F 12/00* (2006.01)

(52) U.S. Cl.
CPC ................ *G06F 9/52* (2013.01); *G06F 9/526* (2013.01); *G06F 12/00* (2013.01)

(58) Field of Classification Search
None
See application file for complete search history.

(56) References Cited

U.S. PATENT DOCUMENTS 5,274,809 A 12/1993 Iwasaki et al.
6,687,904 B1 2/2004 Gomes et al.
(Continued)

FOREIGN PATENT DOCUMENTS

JP 01-297760 11/1989
JP 05-257902 10/1993
(Continued)

OTHER PUBLICATIONS

Japanese International Preliminary Report on Patentability mailed Oct. 10, 2013 in corresponding International Patent Application No. PCT/JP2011/058359.

(Continued)

*Primary Examiner* — Abu Ghaffari
(74) *Attorney, Agent, or Firm* — Staas & Halsey LLP

(57) ABSTRACT

An exclusive access control method is executed by a computer having an operating system that when an excluded thread accesses a shared resource, executes a first exclusive access control process of prohibiting the excluded thread from attempting to access the shared resource until exclusive access control is released, the exclusive access control process being executed according to a number of attempts, by the excluded thread, to access the shared resources. The exclusive access control method includes counting by at least one second thread, including the excluded thread and different from a first thread, the number of attempts to access the shared resource, when the first thread executes a second exclusive access control process of allowing the excluded thread to attempt to access the shared resource until the excluded thread is permitted access; and storing to a memory area by the second thread, the counted number of attempts.

14 Claims, 16 Drawing Sheets

(56) References Cited

U.S. PATENT DOCUMENTS 6,757,769 B1* 6/2004 Ofer .................... G06F 9/524 710/200
7,246,187 B1* 7/2007 Ezra .................... G06F 9/526 710/200
7,594,234 B1* 9/2009 Dice .................... G06F 9/526 718/100
7,725,572 B1* 5/2010 Kautzleben ......... H04L 12/2602 709/224
8,225,048 B2* 7/2012 Lesartre ............ G06F 13/1642 711/141
8,407,432 B2* 3/2013 Cai ..................... G06F 12/0811 711/157
9,465,670 B2* 10/2016 Grochowski ............ G06F 9/52
2003/0065704 A1* 4/2003 Buch .................... G06F 9/52 718/107
2004/0054880 A1* 3/2004 Bernstein ............ G06F 9/30076 712/245
2005/0125789 A1* 6/2005 Dijkstra ............... G06F 9/4881 718/100
2006/0212876 A1* 9/2006 Buch .................... G06F 9/526 718/107
2009/0307707 A1* 12/2009 Gellerich ............... G06F 9/526 718/107
2009/0328053 A1* 12/2009 Dice .................... G06F 9/526 718/104
2010/0275209 A1* 10/2010 Detlefs ................. G06F 9/526 718/102
2011/0161539 A1* 6/2011 Anand ................... G06F 9/526 710/200

FOREIGN PATENT DOCUMENTS

JP 10-312294 11/1998
JP 11-085574 3/1999
JP 2001-084235 3/2001
JP 2001-297008 10/2001
JP 2002-149480 5/2002

OTHER PUBLICATIONS

English language International Search Report for PCT/JP2011/058359, mailed Jul. 5, 2011, 2 pages.
Japanese Office Action dated Dec. 2, 2014 in corresponding Japanese Patent Application No. 2013-507019.

* cited by examiner 200
205
NETWORK
204
I/F
203
202
211
209
FLASH ROM CONTROLLER
210
FLASH ROM
208
FLASH ROM
231_3
THREAD
221_3
OS
201_3
CPU
207
ROM
231_2
THREAD
221_2
OS
201_2
CPU
206
RAM
231_1
THREAD
221_1
OS
201_1
CPU 200
231_1
THREAD
221_1
OS
201_1
CPU
231_2
THREAD
221_2
OS
201_2
CPU
231_3
THREAD
221_3
OS
201_3
CPU
211
(6) NOTIFY
(7) REGISTER
(1) SECURE
(4) SET
(3) SECURE
(5) SET
(2) ACQUIRE
208
400
APP NAME
TOTAL NUMBER OF THREADS
APP A
3
...
...
FLASH ROM
206
401_3
401_2
401_1
402_3
402_2
402_1
SC=0
STAND-BY START TIME REGISTER
403
EXCLUSION FLAG=0
IDLE
404
EXCLUSION METHOD FLAG=0
SPINLOCK
PROCESS DATA AREA
410
RAM
REFERENCE INFORMATION
FLAG STAND-BY QUEUE
OS DATA AREA
411
405
406

SHARED RESOURCE
THREAD 231_1 UNDER USE
EXCLUSION METHOD FLAG 404
0 (SPINLOCK)
EXCLUSION FLAG 403
0 (IDLE)
1 (UNDER USE)
THREAD 231_3
THREAD 231_2
THREAD 231_1
401_1
401_2
401_3
SC=0
SC=1
SC=2
SC=3
SC=4
CHECK
CHANGE TO "1"
PROCESS THAT DID NOT USE SHARED RESOURCE
PROCESS THAT USED SHARED RESOURCE
TIME
CHECK OF EXCLUSION METHOD FLAG
CHECK OF EXCLUSION FLAG

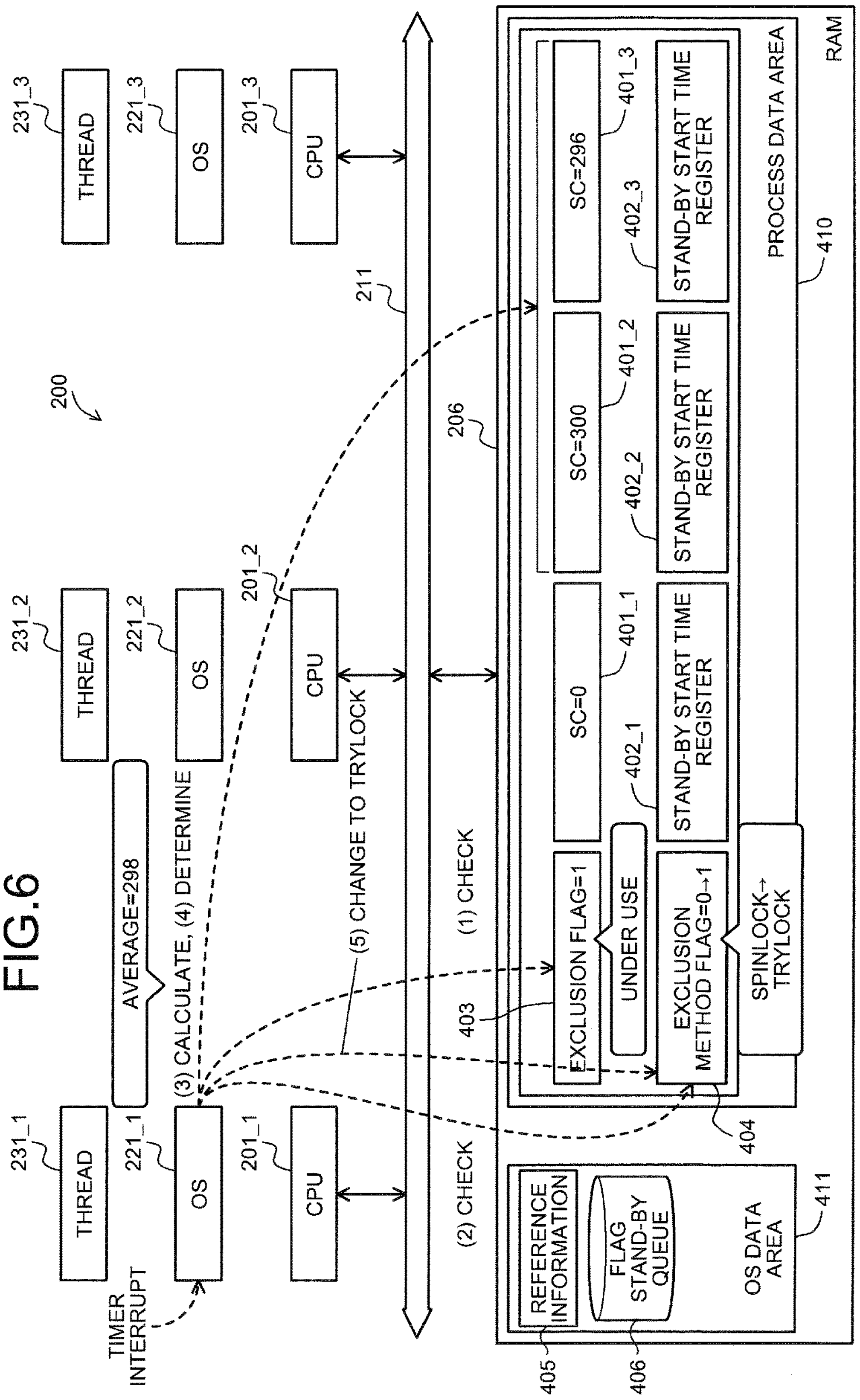
FIG.6
200
231_1
THREAD
231_2
THREAD
231_3
THREAD
221_1
OS
221_2
OS
221_3
OS
201_1
CPU
201_2
CPU
201_3
CPU
TIMER INTERRUPT
AVERAGE=298
(3) CALCULATE, (4) DETERMINE
(5) CHANGE TO TRYLOCK
(1) CHECK
(2) CHECK
211
206
RAM
PROCESS DATA AREA
410
SC=0
401_1
SC=300
401_2
SC=296
401_3
STAND-BY START TIME REGISTER
402_1
STAND-BY START TIME REGISTER
402_2
STAND-BY START TIME REGISTER
402_3
EXCLUSION FLAG=1
403
UNDER USE
EXCLUSION METHOD FLAG=0→1
404
SPINLOCK→ TRYLOCK
REFERENCE INFORMATION
405
FLAG STAND-BY QUEUE
406
OS DATA AREA
411

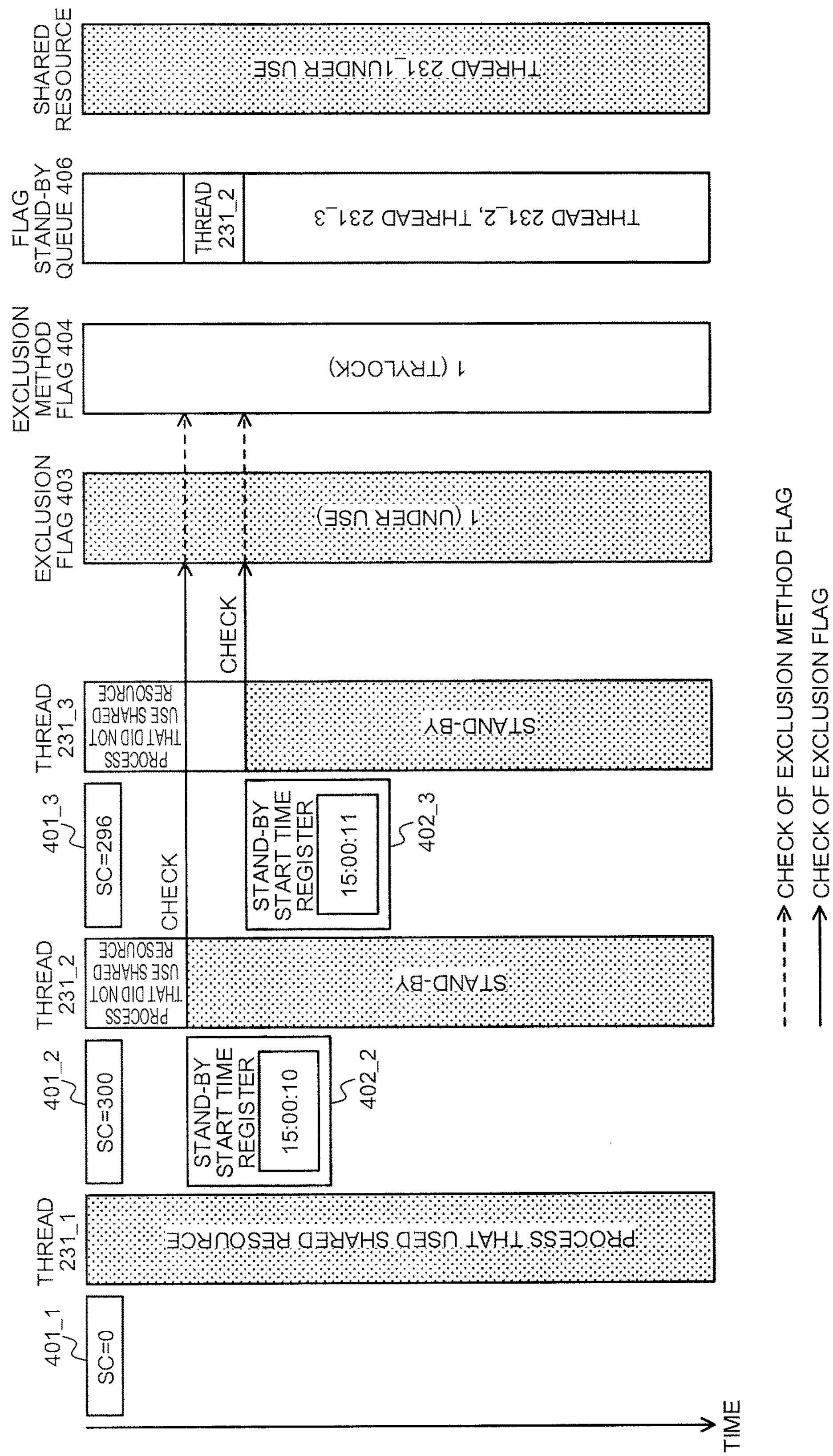
FIG.7
TIME
401_1
SC=0
THREAD 231_1
PROCESS THAT USED SHARED RESOURCE
401_2
SC=300
STAND-BY START TIME REGISTER
15:00:10
402_2
THREAD 231_2
PROCESS THAT DID NOT USE SHARED RESOURCE
STAND-BY
CHECK
401_3
SC=296
STAND-BY START TIME REGISTER
15:00:11
402_3
THREAD 231_3
PROCESS THAT DID NOT USE SHARED RESOURCE
STAND-BY
CHECK
EXCLUSION FLAG 403
1 (UNDER USE)
EXCLUSION METHOD FLAG 404
1 (TRYLOCK)
FLAG STAND-BY QUEUE 406
THREAD 231_2
THREAD 231_2, THREAD 231_3
SHARED RESOURCE
THREAD 231_1UNDER USE
CHECK OF EXCLUSION METHOD FLAG
CHECK OF EXCLUSION FLAG

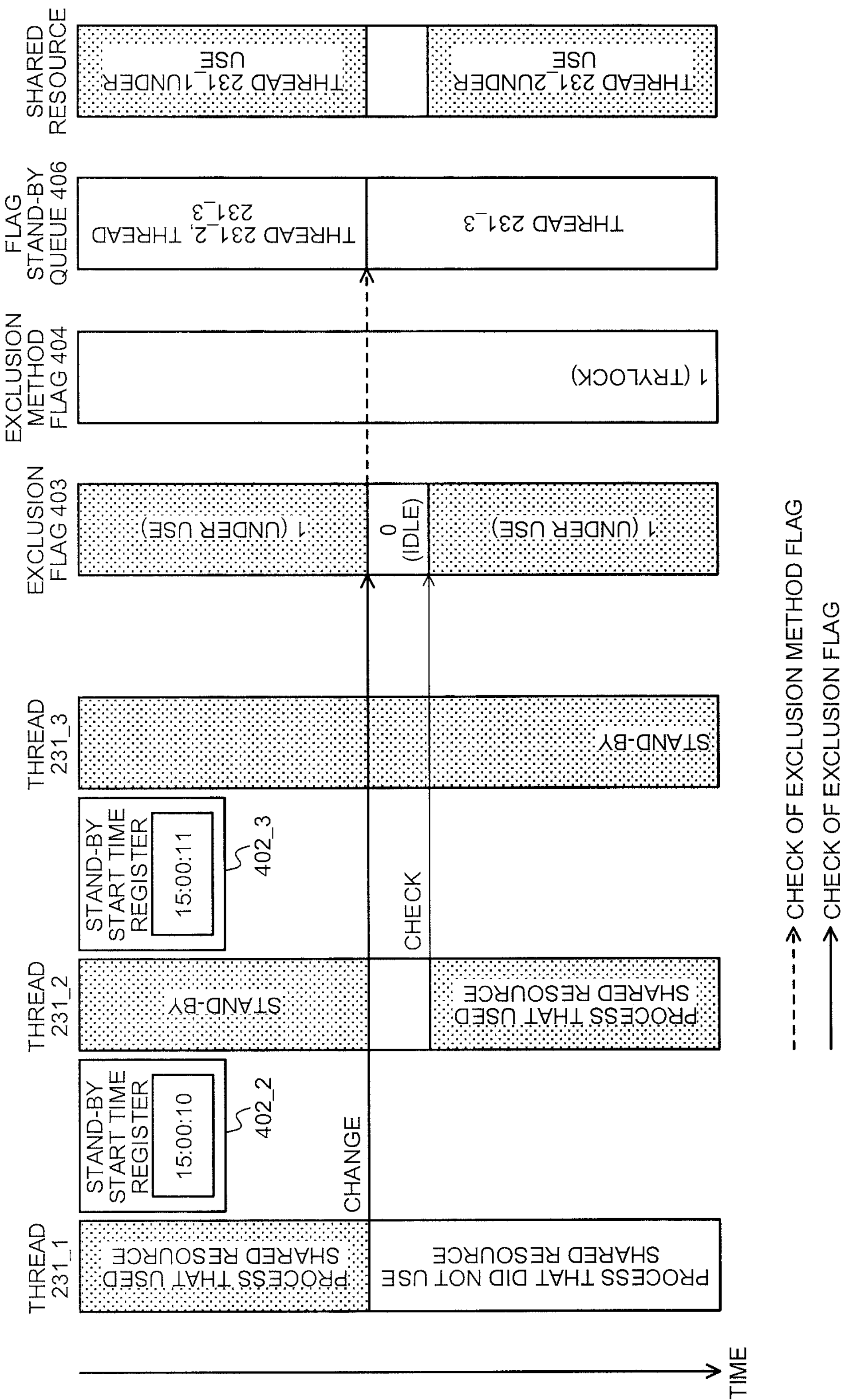
FIG.9
TIME
THREAD 231_1
PROCESS THAT USED SHARED RESOURCE
PROCESS THAT DID NOT USE SHARED RESOURCE
STAND-BY START TIME REGISTER
15:00:10
402_2
CHANGE
THREAD 231_2
STAND-BY
PROCESS THAT USED SHARED RESOURCE
STAND-BY START TIME REGISTER
15:00:11
402_3
CHECK
THREAD 231_3
STAND-BY
EXCLUSION FLAG 403
1 (UNDER USE)
0 (IDLE)
1 (UNDER USE)
EXCLUSION METHOD FLAG 404
1 (TRYLOCK)
FLAG STAND-BY QUEUE 406
THREAD 231_2, THREAD 231_3
THREAD 231_3
SHARED RESOURCE
THREAD 231_1UNDER USE
THREAD 231_2UNDER USE
CHECK OF EXCLUSION METHOD FLAG
CHECK OF EXCLUSION FLAG

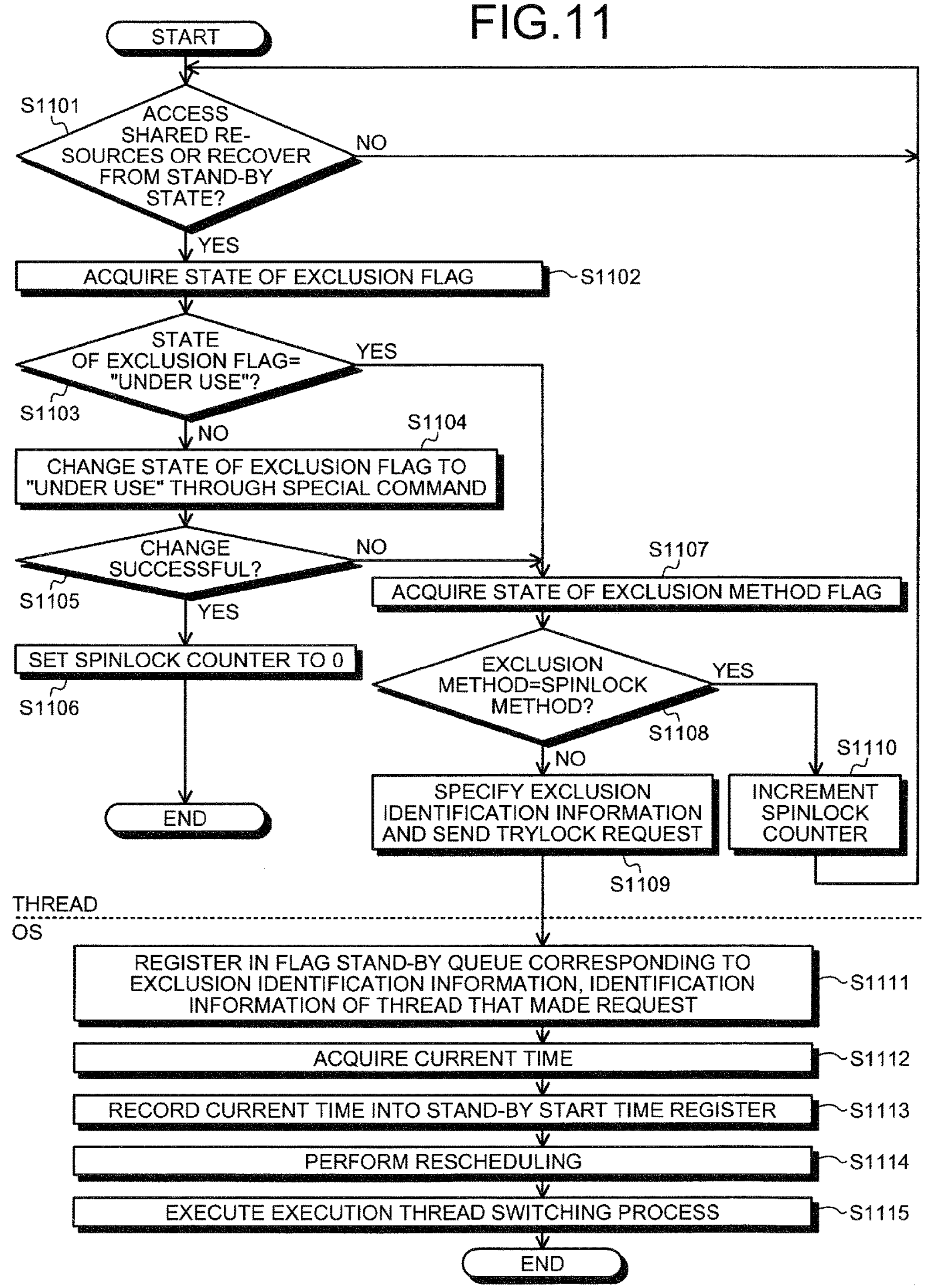
FIG.11
START
S1101
ACCESS SHARED RE-SOURCES OR RECOVER FROM STAND-BY STATE?
NO
YES
ACQUIRE STATE OF EXCLUSION FLAG
S1102
STATE OF EXCLUSION FLAG= "UNDER USE"?
YES
S1103
NO
S1104
CHANGE STATE OF EXCLUSION FLAG TO "UNDER USE" THROUGH SPECIAL COMMAND
CHANGE SUCCESSFUL?
NO
S1107
S1105
YES
ACQUIRE STATE OF EXCLUSION METHOD FLAG
SET SPINLOCK COUNTER TO 0
S1106
EXCLUSION METHOD=SPINLOCK METHOD?
YES
S1108
S1110
NO
END
SPECIFY EXCLUSION IDENTIFICATION INFORMATION AND SEND TRYLOCK REQUEST
INCREMENT SPINLOCK COUNTER
S1109
THREAD
OS
REGISTER IN FLAG STAND-BY QUEUE CORRESPONDING TO EXCLUSION IDENTIFICATION INFORMATION, IDENTIFICATION INFORMATION OF THREAD THAT MADE REQUEST
S1111
ACQUIRE CURRENT TIME
S1112
RECORD CURRENT TIME INTO STAND-BY START TIME REGISTER
S1113
PERFORM RESCHEDULING
S1114
EXECUTE EXECUTION THREAD SWITCHING PROCESS
S1115
END

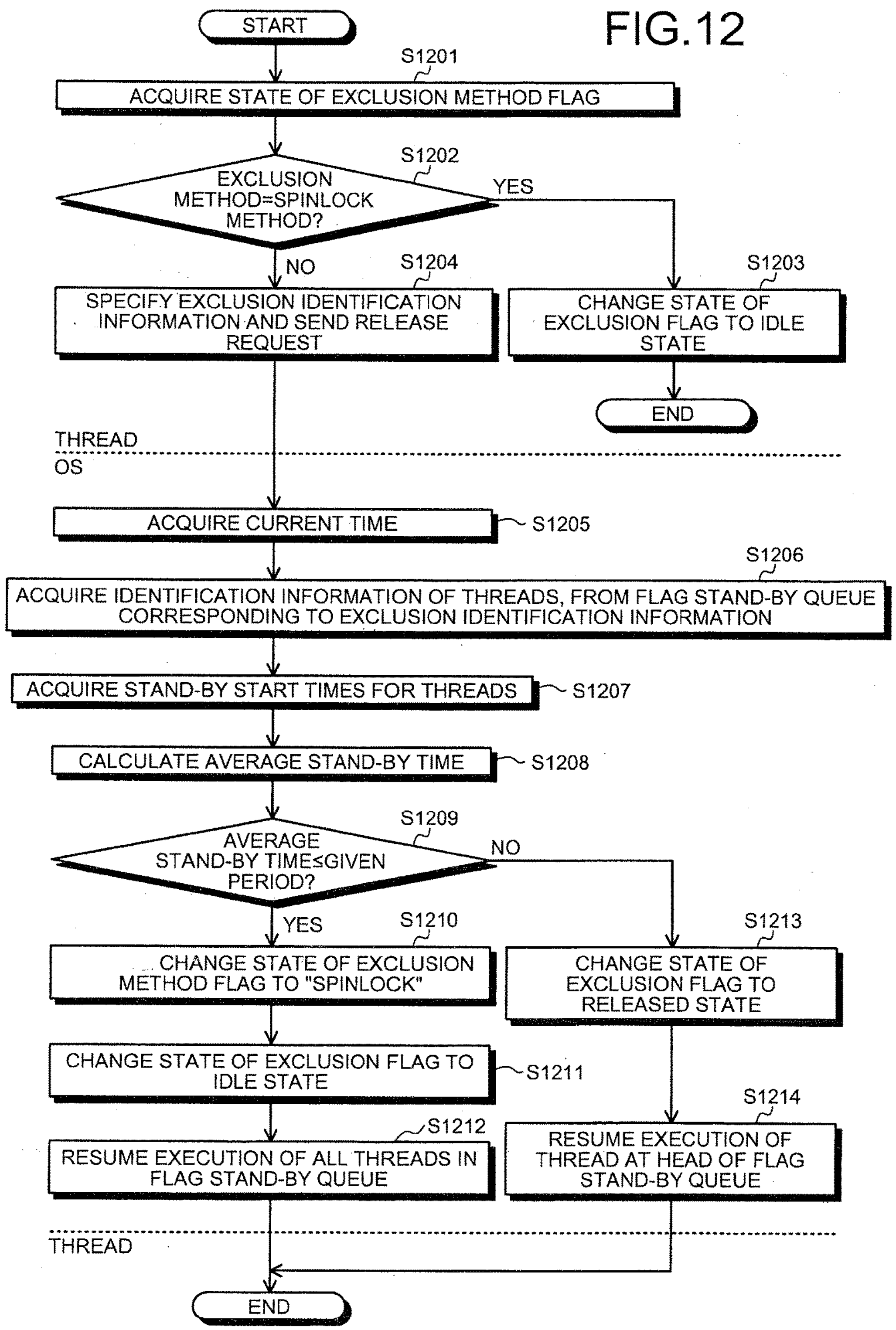
FIG.12
START
S1201
ACQUIRE STATE OF EXCLUSION METHOD FLAG
S1202
EXCLUSION METHOD=SPINLOCK METHOD?
YES
NO
S1204
SPECIFY EXCLUSION IDENTIFICATION INFORMATION AND SEND RELEASE REQUEST
S1203
CHANGE STATE OF EXCLUSION FLAG TO IDLE STATE
END
THREAD
OS
ACQUIRE CURRENT TIME
S1205
S1206
ACQUIRE IDENTIFICATION INFORMATION OF THREADS, FROM FLAG STAND-BY QUEUE CORRESPONDING TO EXCLUSION IDENTIFICATION INFORMATION
ACQUIRE STAND-BY START TIMES FOR THREADS
S1207
CALCULATE AVERAGE STAND-BY TIME
S1208
S1209
AVERAGE STAND-BY TIME≤GIVEN PERIOD?
NO
YES
S1210
CHANGE STATE OF EXCLUSION METHOD FLAG TO "SPINLOCK"
S1213
CHANGE STATE OF EXCLUSION FLAG TO RELEASED STATE
CHANGE STATE OF EXCLUSION FLAG TO IDLE STATE
S1211
S1212
RESUME EXECUTION OF ALL THREADS IN FLAG STAND-BY QUEUE
S1214
RESUME EXECUTION OF THREAD AT HEAD OF FLAG STAND-BY QUEUE
THREAD
END

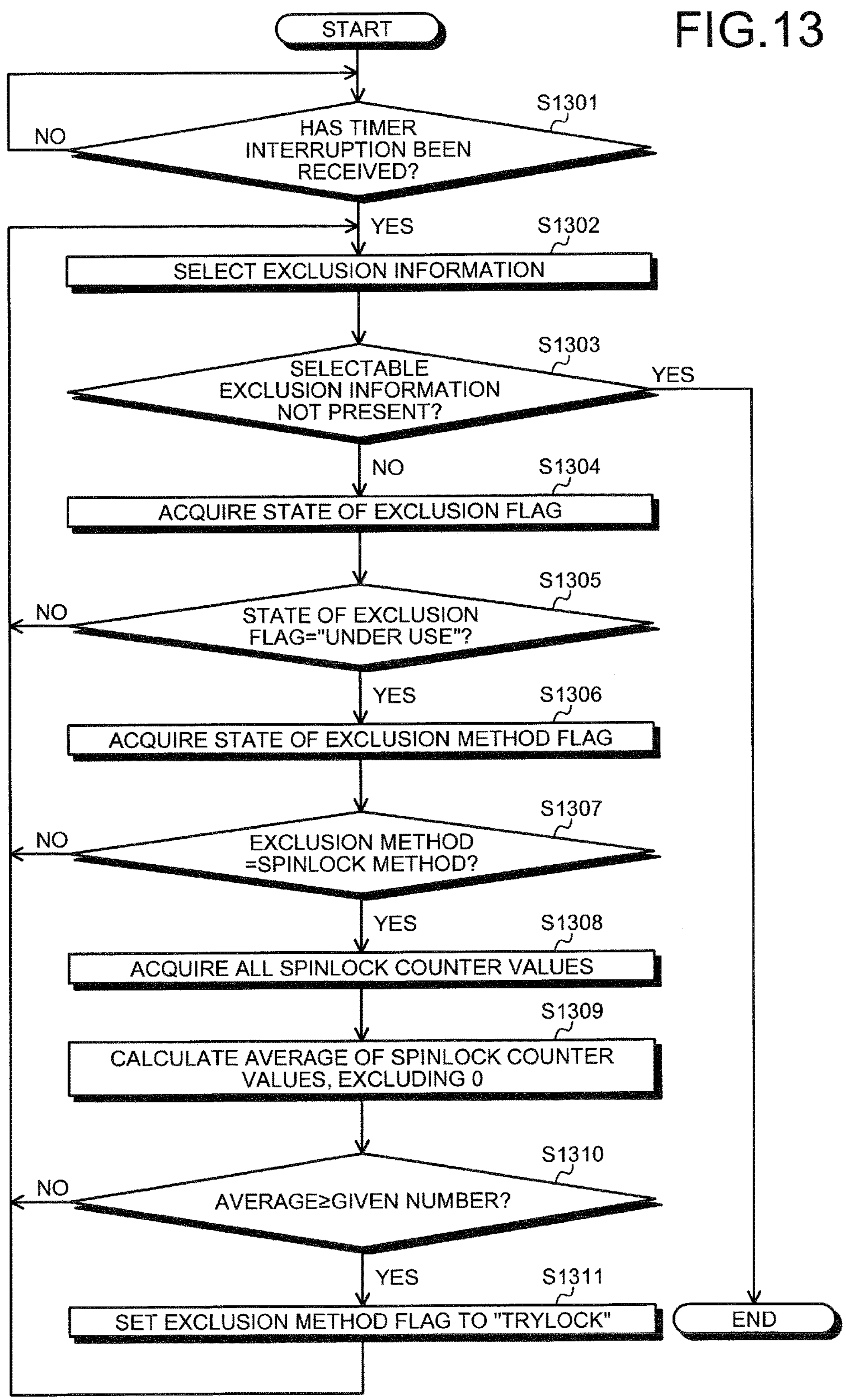
FIG.13
START
S1301
HAS TIMER INTERRUPTION BEEN RECEIVED?
NO
YES
S1302
SELECT EXCLUSION INFORMATION
S1303
SELECTABLE EXCLUSION INFORMATION NOT PRESENT?
YES
NO
S1304
ACQUIRE STATE OF EXCLUSION FLAG
S1305
STATE OF EXCLUSION FLAG="UNDER USE"?
NO
YES
S1306
ACQUIRE STATE OF EXCLUSION METHOD FLAG
S1307
EXCLUSION METHOD =SPINLOCK METHOD?
NO
YES
S1308
ACQUIRE ALL SPINLOCK COUNTER VALUES
S1309
CALCULATE AVERAGE OF SPINLOCK COUNTER VALUES, EXCLUDING 0
S1310
AVERAGE≥GIVEN NUMBER?
NO
YES
S1311
SET EXCLUSION METHOD FLAG TO "TRYLOCK"
END

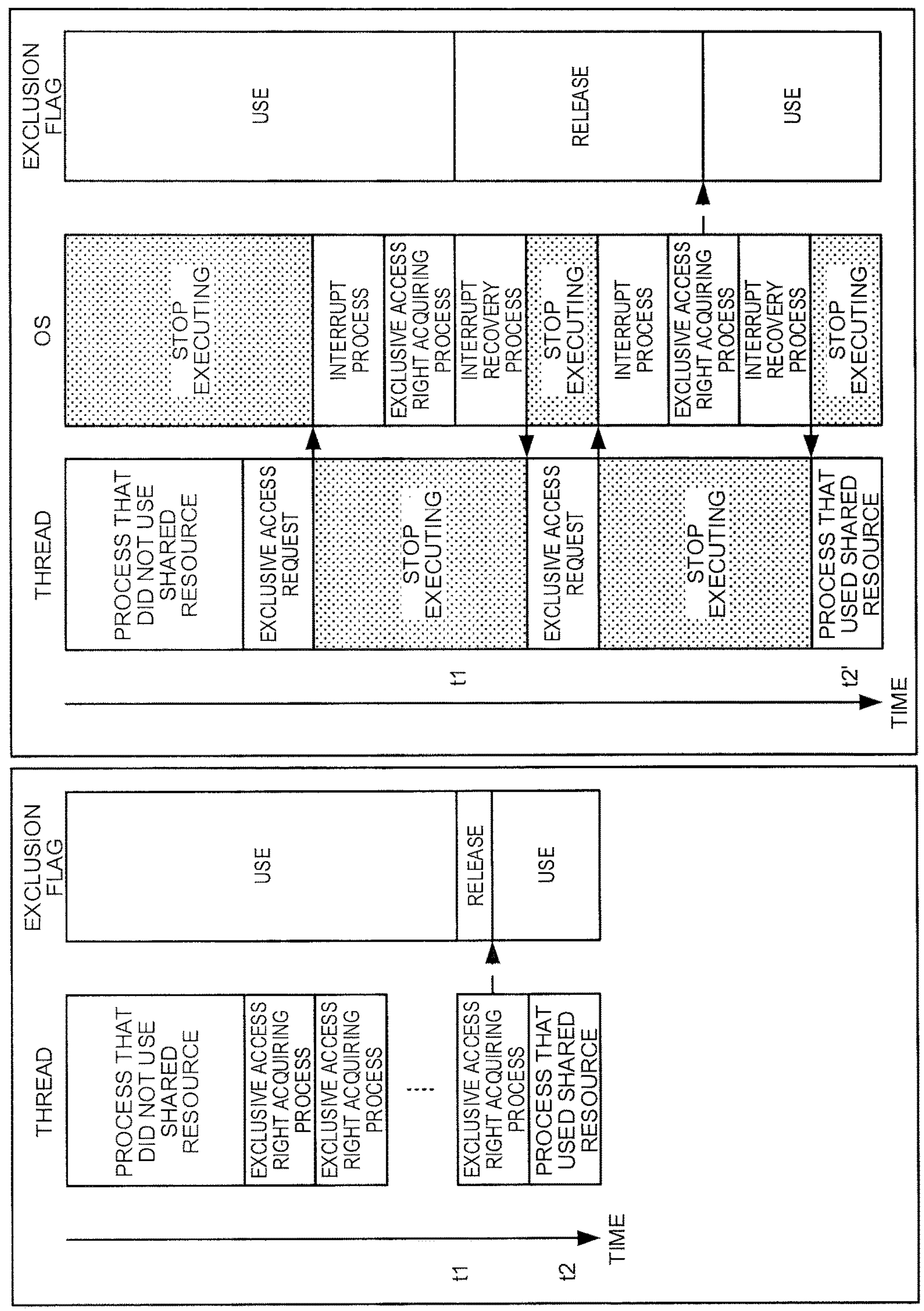

FIG.17
THREAD
EXCLUSION FLAG
PROCESS THAT DID NOT USE SHARED RESOURCE
EXCLUSIVE ACCESS RIGHT ACQUIRING PROCESS
EXCLUSIVE ACCESS RIGHT ACQUIRING PROCESS
....
EXCLUSIVE ACCESS RIGHT ACQUIRING PROCESS
PROCESS THAT USED SHARED RESOURCE
USE
RELEASE
USE
t1
t2
TIME
THREAD
OS
EXCLUSION FLAG
PROCESS THAT DID NOT USE SHARED RESOURCE
EXCLUSIVE ACCESS REQUEST
STOP EXECUTING
EXCLUSIVE ACCESS REQUEST
STOP EXECUTING
PROCESS THAT USED SHARED RESOURCE
STOP EXECUTING
INTERRUPT PROCESS
EXCLUSIVE ACCESS RIGHT ACQUIRING PROCESS
INTERRUPT RECOVERY PROCESS
STOP EXECUTING
INTERRUPT PROCESS
EXCLUSIVE ACCESS RIGHT ACQUIRING PROCESS
INTERRUPT RECOVERY PROCESS
STOP EXECUTING
USE
RELEASE
USE
t1
t2'
TIME

EXCLUSIVE ACCESS CONTROL METHOD PROHIBITING ATTEMPT TO ACCESS A SHARED RESOURCE BASED ON AVERAGE NUMBER OF ATTEMPTS AND PREDETERMINED THRESHOLD

CROSS REFERENCE TO RELATED APPLICATIONS

This application is a continuation application of International Application PCT/JP2011/058359, filed on Mar. 31, 2011 and designating the U.S., the entire contents of which are incorporated herein by reference.

FIELD

The embodiment discussed herein is related to an exclusive access control method and an exclusive access control program for controlling access of shared resources.

BACKGROUND

In a multi-core processor system or a single processor system equipped with a multi-task operating system (OS), multiple processes or threads can operate simultaneously.

For example, a case is assumed where a thread #0 and a thread #1 simultaneously attempt to add 1 to a variable x in memory. This process of adding 1 to the variable x is performed as three operation steps by a central processing unit (CPU). The operation steps include reading the value of the variable x from the memory, adding 1 to the read value, and writing the result of the addition to the variable x in the memory.

FIG. 14 is an explanatory diagram of an example of access of shared resources in a multi-core processor system. It is assumed that in the multi-core processor system, for example, the thread #0 and the thread #1 are executed simultaneously at a CPU #0 and a CPU #1, respectively. At time t1 when the thread #0 reads the value of the variable x from the memory according to a Load command, the value of the variable x is 0. The read value of the variable x is stored to a register R1 in the CPU, and 1 is added to the value in the register R1 at time t2, then the result of the addition is stored to the register R1. At time t2, the thread #1 is executed at the CPU #1 and the thread #1 reads the value of the variable x according to a Load command, similarly as the thread #0. Because the value of the variable x is 0 at this moment, 0 is stored in the register R2 of the CPU #1.

$$\text{time } t1{:}R1=x=0$$

$$\text{time } t2{:}R1=R1+1=1,\ R2=x=0$$

At time t3, the thread #0 writes the value in the register R1 to the variable x in the memory. At time t4, the thread #1 then writes the result of adding 1 to the value in the register R2, to the variable x. This result of addition 1 is 1 and thus, 1 is written to the variable x again.

$$\text{time } t3{:}x=R1=1,\ R2=R2+1=1$$

$$\text{time } t4{:}x=R2=1$$

In this manner, when the thread #1 reads the value of the variable x from the memory before the thread #0 writes to the variable x, the result of adding 1 to the value of the variable x, the resulting increment of the value of the variable x is 1 despite the fact 1 is added twice to the variable x. This problem occurs also in a single processor system running a multi-task OS because multiple processes or threads are executed through a time-sharing procedure in such a system.

When shared resources, such as data in a share memory and a hardware device for direct memory access (DMA), are used by multiple processes or threads, exclusive access control has to be performed. Under exclusive access control, an exclusion flag placed in the memory is updated, using a special command, such as swap command and exclusive load/store command, provided by the CPU, in order to manage information on whether shared resources associated with the exclusion flag is being used.

In data writing by a special command, if multiple CPUs simultaneously attempt to write values to the same flag, only one CPU manages to succeed in writing-in. After a value is written to the flag according to the special command, only the thread having checked the result of the special command and written a value indicative of the shared resources being used to the exclusion flag acquires access right to the shared resources to use. In the case of the single processor system, causing the OS to update the exclusion flag makes possible performing exclusive access control without using the special command. After finishing using the shared resources, the thread having acquired the access right writes a value indicative of release of the resources to the exclusion flag at time t2 and thereby, declares the end of use of the shared resources.

A thread having failed to acquire the access right must wait until the thread having acquired the access right finishes using the shared resources and releases the access right. Spinlock and trylock are known as two methods of causing a thread having failed to acquire the access right to wait until release of the access right.

FIG. 15 is an explanatory diagram of an example of spinlock. As indicated in FIG. 15, in spinlock, a thread having failed to acquire access right repeats an exclusive access right acquiring process until the value of the exclusion flag is replaced with a value indicative of the shared resources being released. In spinlock, when completing use of the shared resources, a thread having acquired the access right through exclusive access control writes a value indicative of the shared resources being released to the exclusion flag and thereby, declares the completion of use of the shared resources.

In FIG. 15, because the thread #1 has acquired the exclusive access right first at time t1, the thread #0 fails to acquire the exclusive access right at time t2 and therefore repeatedly attempts to acquire the exclusive access right. The thread #1 releases the exclusive access right at time #3. This allows the thread #0 to successfully acquire the exclusive access right at time t4 immediately after the release of the exclusive access right.

FIG. 16 is an explanatory diagram of an example of trylock. As indicated in FIG. 16, in trylock, execution of a thread having failed to acquire access right is suspended until the access right is released. In the case of trylock, when use of shared resources is completed, the value of the exclusion flag is changed to "released" and release of the access right is communicated to the OS. When the access right is released, the OS resumes execution of the suspended thread.

In FIG. 16, the thread #0 attempts to acquire exclusive access right at time t1 but the exclusion flag is already set to "under use" by the thread #1. Consequently, the OS changes the state of the thread #0 to a stand-by state, which brings the exclusive access right to a different thread (thread #1).

Afterward, when the thread #1 releases the flag, the OS changes the state of the thread #0 back to an executable state.

In spinlock, the exclusion flag is repeatedly checked until the shared resources are released. As a result, if the shared resources are not released for a long period, the processing capacity of the CPU may be used wastefully. In the case of trylock, execution of a thread is suspended until the shared resources are released. As the thread is kept suspended, a different thread is executed or, if no executable thread is found, the CPU is suspended. For this reason, wasteful use of the processing capacity of the CPU does not happen. However, thread suspension/resumption by the OS creates overhead. In addition, when multiple threads are operating, it is not guaranteed that the thread released from its suspended state can be executed immediately. Hence, overhead arises during a period between the point of time of the shared resources becoming available and the point of time of the start of actual use of the resources.

It is therefore preferable that an exclusive access control process by the spinlock method be performed for shared resources that are released in a short period, while an exclusive access control process by the trylock method be performed for shared resources of which release takes a long time. However, the stand-by time until the release of the shared resources varies depending on the state of the resources and the number of threads in use, and is therefore difficult to determine in a unique manner.

According to a known technique, stand-by times until the release of exclusive access right are recorded as statistical information so that a proper exclusive access control method is adopted at the execution of a thread (see, e.g., Japanese Laid-Open Patent Publication No. 2001-84235). A technique of recording statistical information of stand-by times until the release of exclusive access right at the execution of a thread is also known (see, e.g., Japanese Laid-Open Patent Publication No. H10-312294), and another technique of switching the exclusive access control method at the execution of a thread is also known (see, e.g., Japanese Laid-Open Patent Publication No. H11-85574).

The conventional techniques, however, pose a problem in that the cost of calling the OS for use in exclusive access control is not considered. A process of simply checking the exclusion flag in spinlock is usually realized by several commands, in which case, with consideration of memory access cost, it takes several ten to hundred nanoseconds to check the exclusion flag once.

When the exclusion flag is updated by the OS, however, the OS must be called to check the exclusion flag. Calling the OS from an application program requires a process of shifting the OS to a privileged mode using an interruption command, etc. and therefore, takes several ten to hundred microseconds, which is far greater than the time required for the flag check process.

FIG. 17 is an explanatory diagram of calling costs resulting from use of the OS. As indicated in FIG. 17, when a thread checks the exclusion flag (time t1) and immediately thereafter, another CPU releases the flag, if the function of the OS is not used (as indicated by the portion on the left), the thread acquires the flag at time t2 and can start a process using the shared resources. If the function of the OS is used (as indicated by the portion on the right), however, the OS cancels interruption first and then returns to the process on the thread. When the thread makes another exclusive access right acquisition request, the OS takes over the process to acquire exclusive access right, and then returns to the process on the thread again. In this manner, in the case of using the OS, the process is alternately executed at the OS and the thread. As a result, the thread cannot start the process using the shared resources until time t2'.

For example, with the techniques above, if the OS switches between exclusive control processing using an attempt log and exclusive control processing using a spin log, a problem arises in that overhead by the OS arises for the alternate execution of the process at the OS and the thread.

SUMMARY

According to an aspect of an embodiment, an exclusive access control method is executed by a computer having an operating system that when an excluded thread accesses a shared resource, executes a first exclusive access control process of prohibiting the excluded thread from attempting to access the shared resource until exclusive access control is released, the exclusive access control process being executed according to a number of attempts, by the excluded thread, to access the shared resources, and the number of attempts being stored in a memory area. The exclusive access control method includes counting by at least one second thread, including the excluded thread and different from a first thread, the number of attempts to access the shared resource, when the first thread among a plurality of threads executes a second exclusive access control process of allowing the excluded thread to attempt to access the shared resource until the excluded thread is permitted access; and storing to the memory area by the second thread, the number of attempts counted at the counting.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram of an example of a process executed when timer interruption occurs;

FIG. 7 is an explanatory diagram of an example of execution of trylock;

FIG. 9 is an explanatory diagram of an example of the start of an exclusion process by a thread 231_2;

FIG. 11 is a flowchart of an example of a procedure executed when exclusive access control by an OS and a thread is started;

FIG. 12 is an example of a procedure executed when exclusive access right is released by an OS and a thread;

FIG. 13 is an example of an exclusive access control procedure executed by the OS when timer interruption occurs;

FIG. 17 is an explanatory diagram of calling costs resulting from use of the OS.

DESCRIPTION OF EMBODIMENTS

An embodiment of an exclusive control method and an exclusive control method will be described in detail with reference to the accompanying drawings.

Figure 1:
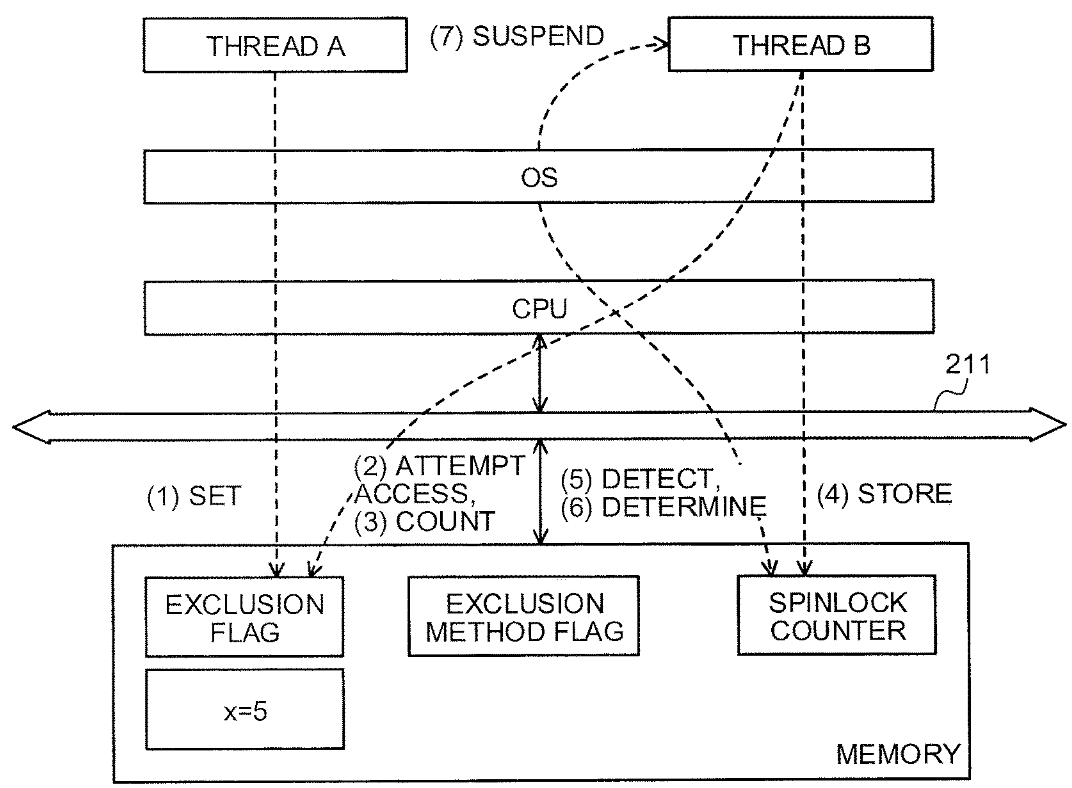
FIG. 1 is an explanatory diagram of an example of an exclusive control method.

FIG. 1 is an explanatory diagram of an example of the exclusive control method. In FIG. 1, a thread A and a thread B share a variable x; an exclusion flag is in an idle state; and an exclusion method flag indicates spinlock.

For example, when the thread A (1) sets the exclusion flag to "under use" in order to access the variable x, the thread A is permitted to access the variable x. When the thread B acquires the exclusion flag in order to access the variable x, the thread B is prohibited from accessing the variable x because the exclusion flag is already updated to "under use". Thus, the thread B executes an exclusive access control process by the spinlock method. The thread B (2) repeatedly acquires the exclusion flag and attempts to access the variable x until access of the variable x is permitted. For example, the thread B (3) counts the number of attempts and (4) stores the number of attempts to a spinlock counter.

For example, an OS (5) detects the value of the spinlock counter at constant intervals. The OS determines (6) whether the value of the spinlock counter indicates a given number. If the value of the spinlock counter indicates the given number, for example, the OS (7) suspends the thread B to prohibit access attempts by the thread B.

An exclusive access control apparatus according to the embodiment is provided as a single core system or a multi-core processor system. In this embodiment, a multi-core processor system will be described as an example. In the multi-core processor system, a multi-core processor is a processor equipped with multiple cores. As long as multiple cores are provided, the multi-core processor may be implemented as a single processor equipped with multiple cores or as a group single-core processors in parallel. In this embodiment, for simplification of the description, a group of single-core processors in parallel will be described as an example.

Figure 2:
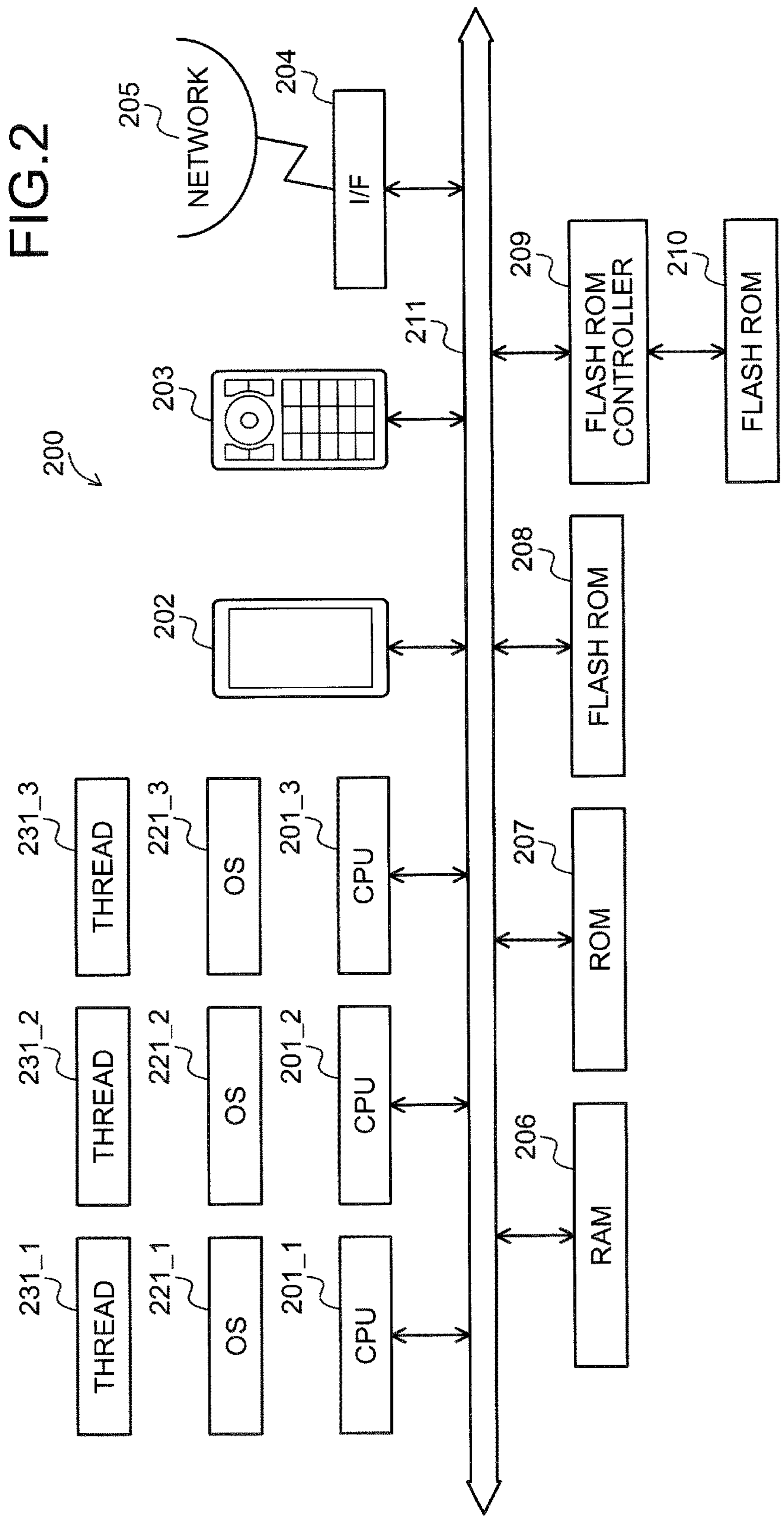
FIG. 2 is a block diagram of an example of hardware of a multi-core processor system according to an embodiment.

FIG. 2 is a block diagram of an example of hardware of a multi-core processor system according to the embodiment. A multi-core processor system 200 includes a CPU 201_1, a CPU 201_2, a CPU 201_3, a display 202, a keyboard 203, an interface (I/F) 204, random access memory (RAM) 206, and read only memory (ROM) 207. The multi-core processor system 200 also includes flash ROM 208, a flash ROM controller 209, and flash ROM 210.

The CPU 201_1 to CPU 201_3, the display 202, the keyboard 203, the interface (I/F) 204, the RAM 206, the ROM 207, the flash ROM 208, and the flash ROM controller 209 are interconnected through a bus 211.

Each of the CPU 201_1 to CPU 201_3 has a register, a core, and a cache. The core has a computing function. The register in each CPU has a program counter (PC) and a reset register.

The CPU 201_1 is a master CPU, performs overall control of the multi-core processor system 200, and executes an OS 221_1. The OS 221_1 is a master OS and executes a thread assigned to the CPU 201_1. The OS 221_1 has a scheduler, which has a function of determining from among CPUs making up the multi-core processor, a CPU to be assigned an application for which a start instruction has been received. The scheduler has a function of controlling the order of execution of applications assigned to the CPU 201_1.

The CPU 201_2 and the CPU 201_3 are slave CPUs and run the OS 221_2 and the OS 221_3, respectively. The OS 221_2 and the OS 221_3 are slave OSs and execute threads assigned to the CPU 201_2 and the CPU 201_3, respectively. The OS 221_2 has a scheduler, which has a function of controlling the order of execution of applications assigned to the CPU 201_2. The OS 221_3 has a scheduler, which has a function of controlling the order of execution of applications assigned to the CPU 201_3. Threads 231_1 to 231_3 are threads on an app A and share the same variable. The thread 231_1, the thread 231_2, and the thread 231_3 are assigned to the CPU 201_1, the CPU 201_2, and the CPU 201_3, respectively.

The display 202 displays, for example, data such as text, images, functional information, etc., in addition to a cursor, icons, and/or tool boxes. A thin-film-transistor (TFT) liquid crystal display and the like may be employed as the display 202. The keyboard 203 includes, for example, keys for inputting letters, numerals, and various instructions and performs the input of data. Alternatively, a touch-panel-type input pad or numeric keypad, etc. may be adopted.

The I/F 204 is connected to a network 205 such as a local area network (LAN), a wide area network (WAN), and the Internet through a communication line and is connected to other apparatuses through the network 205. The I/F 204 administers an internal interface with the network 205 and controls the input and output of data with respect to external apparatuses. For example, a modem or a LAN adaptor may be employed as the I/F 204.

The ROM 207 stores programs such as a boot program. The RAM 206 is used as a work area of the CPUs. The flash ROM 208 stores system software such as the OSs 221_1 to 221_3, and application software. The access speed of the RAM 206 by the CPUs is faster than that of the flash ROM 208. The OSs load programs of applications from the flash ROM 208 onto the RAM 206, whereby context information of the application is expanded in the RAM 206.

The flash ROM controller 209, under the control of the CPUs, controls the reading and writing of data with respect to the flash ROM 210. The flash ROM 210 stores data written under control of the flash ROM controller 209. Examples of the data include image data and video data acquired by the user of the multi-core processor system through the I/F 204. A memory card, SD card and the like may be adopted as the flash ROM 210.

Figure 3:
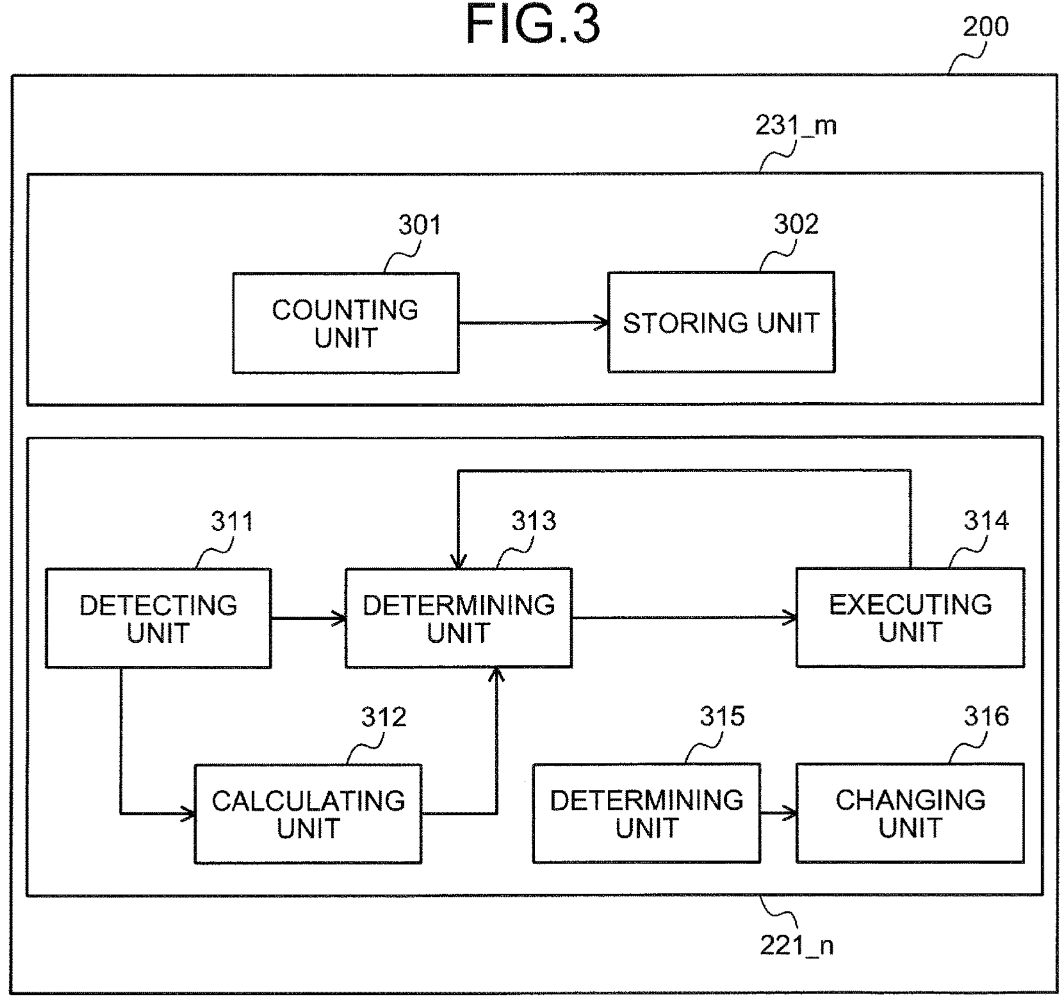
FIG. 3 is a block diagram of an example of functions of a multi-core processor system 200.

FIG. 3 is a block diagram of an example of functions of the multi-core processor system 200. The multi-core processor system 200 includes a thread 231_m (m=1 to 3) and an OS 221_n (n=1 to 3). The thread 231_m has a counting unit 301 and a storing control unit 302. The OS 221_n has a detecting unit 311, a calculating unit 312, a determining unit 313, an executing unit 314, a determining unit 315, and a changing unit 316.

The counting unit 301 and the storing unit 302 are coded in the thread 231_m, which is stored in a memory device, such as the flash ROM 208. Any one of the CPU 201_1 to the CPU 201_3 reads the thread 231_m from a memory device and executes a process coded in the thread 231_m and thereby, executes the respective functions of the counting unit 301 and the storing unit 302. The detecting unit 311 to the changing unit 316 are coded in the OS 221_n, which is stored in a memory device, such as the flash ROM 208. The CPU 201_1 to the CPU 201_3 read the OS 221_1 to the OS 221_3, respectively, from a memory device and execute processes coded in the OS 221_1 to the OS 221_3 and thereby, execute the respective functions of the detecting unit 311 to the changing unit 316.

A case of execution of a second exclusive access control process is assumed, where any one thread among multiple threads allows an excluded thread to repeatedly attempt access until access of shared resources is permitted. In this case, the counting unit 301 counts the number of attempts to access the shared resources by an excluded thread other than the one thread among the multiple threads.

The RAM 206 shared by multiple CPUs and a variable shared by the bus 211 and applications are given as examples of the shared resources. The second exclusive access control process is, for example, the exclusive access control process by the spinlock method. The storing unit 302 stores to a memory area the OS can refer to, the number of attempts counted by the counting unit 301.

The detecting unit 311 detects the number of attempts to access the shared resources by the excluded thread, the number of attempts being stored in the memory area. The determining unit 313 determines whether the number of attempts detected by the detecting unit 311 is greater than or equal to a given number. When multiple excluded threads are present, the calculating unit 312 calculates an average of the numbers of attempts to access the shared resources made by the excluded threads, the numbers of attempts being detected by the detecting unit 311. The storing unit 302 stores the average calculated by the calculating unit 312 to the memory area of the excluded thread.

If the determining unit 313 determines that the numbers of attempts is greater than or equal to the given number, the executing unit 314 executes a first exclusive access control process that prohibits the excluded thread from attempting to access the shared resources until the exclusive access control is released.

Execution of the first exclusive access control process will be described for a case where the excluded thread attempts to access the shared resources, and the excluded thread is prohibited from attempting to access the shared resources until the exclusive access control is released. The determining unit 315 determines whether the time that has elapsed since the start of access by the excluded thread is greater than or equal to a given period.

If the determining unit 315 determines that the elapsed time is not greater than or equal to the given period, the changing unit 316 releases the prohibition imposed on the excluded thread, concerning attempts to access the shared resources. When the determining unit 315 determines that the elapsed time is greater than or equal to the given period, the changing unit 316 maintains the prohibition imposed on the excluded thread. The embodiment will be further described in detail based on the above description.

Figure 4:
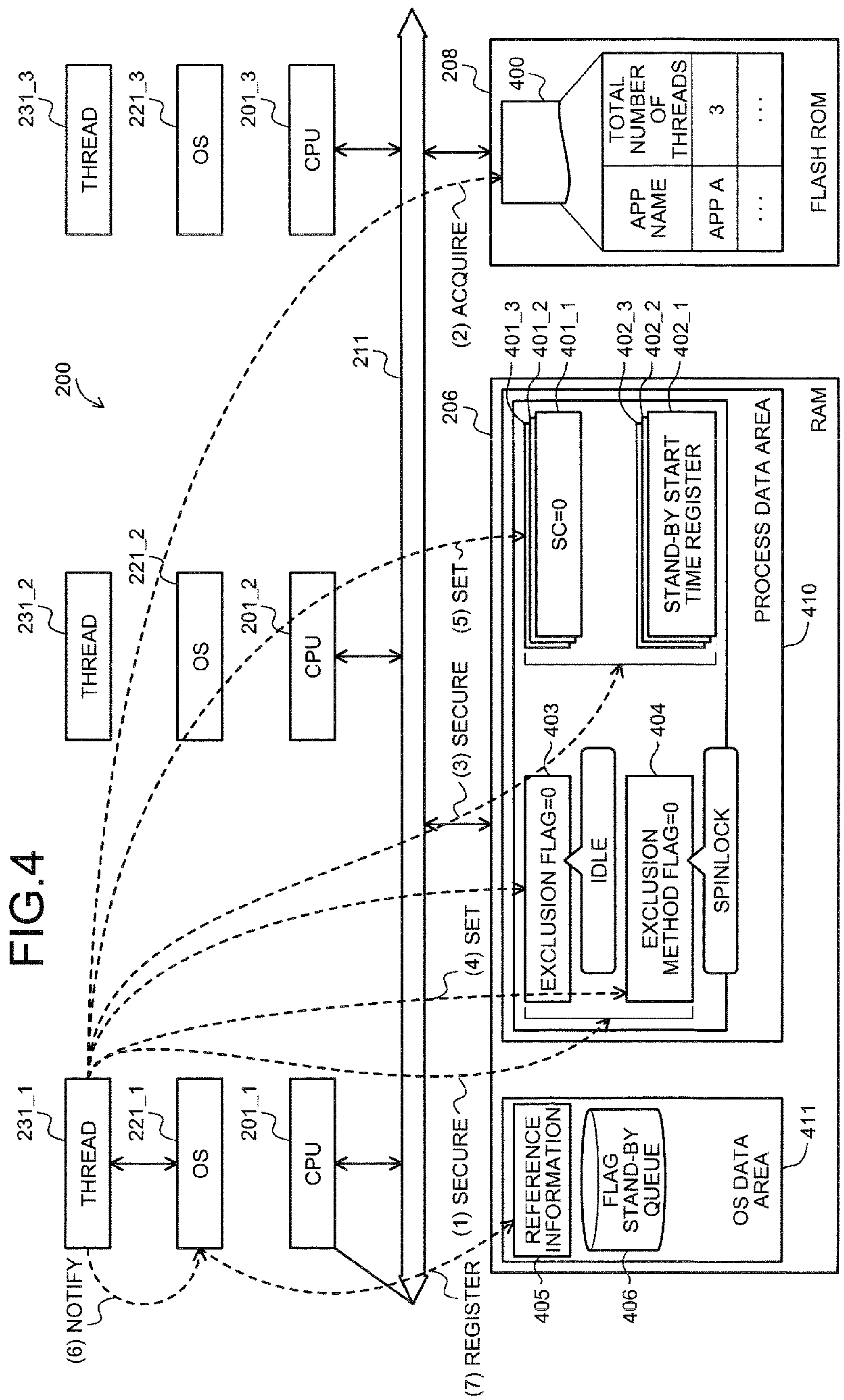
FIG. 4 is an explanatory diagram of generation of an exclusion flag.

FIG. 4 is an explanatory diagram of generation of an exclusion flag. For example, the thread 231_1 (1) secures an area for an exclusion flag 403 and an area for an exclusion method flag 404 in a process data area 410 on the RAM 206. The RAM 206 has an OS data area 411 and the process data area 410. Data handled by each OS is stored to the OS data area 411, and data handled by each thread is stored to the process data area 410. The threads cannot access the process data area 410.

For example, the thread 231_1 (2) acquires the total number of threads, including a planned start of the application to which the thread 231_1 belongs, from a table 400, which has fields of "app name" and "total number of threads". Identification information of the application is registered in the "app name" field, and the total number of threads of the application identified by the identification information in the "app name" field is registered in the "total number of threads" field. In this example, the thread 231_1 is a thread belonging to the app A and thus, the thread 231_1 acquires 3 as the total number of threads.

For example, the thread 231_1 (3) secures in the process data area 410 on the RAM 206, an area for stand-by start time registers of a number equal to the acquired total number of threads, and an area for spinlock counters (SC) of a number equal to the total number of threads. In FIG. 4, areas for SCs 401_1 to 401_3 and stand-by start time registers 402_1 to 402_3 are secured in the process data area 410.

For example, the thread 231_1 (4) sets the exclusion flag 403 to 0 (released state) and sets the exclusion method flag 404 to 0 (spinlock method). For example, the thread 231_1 (5) sets the SCs 401_1 to 401_3 to 0. For example, the thread 231_1 (6) notifies the OS 221_1 of reference information 405 of all secured areas. The reference information 405 is information that allows the OS 221_1 to refer to an area secured in the process data area 410. The reference information 405 includes description of the head address of the secured area that is used by a thread when the thread accesses the secured area.

For example, when the OS 221_1 receives the reference information 405 from the thread 231_1, the OS 221_1 generates exclusion identification information corresponding to the reference information 405. The exclusion identification information is information for identifying information related to exclusion of an area secured by the thread 231_1. While attention is paid to one exclusive access control process in this embodiment, multiple exclusive access control processes are actually performed. Identification information, therefore, is associated with information concerning each exclusion. For example, the OS 221_1 (7) associates and registers in the OS data area 411, exclusion identification information and the reference information 405. For example, when the OS 221_1 receives exclusion identification information from any one of the threads, the OS 221_1 refers to the reference information 405 based on the received exclusion identification information. For example, the OS 221_1 can access data stored in a secured area in the process data area 410, according to the head address of the secured area written in the reference information 405. The OS 221_1 then notifies the thread 231_1 of the exclusion identification information. Receiving the exclusion identification information from the OS 221_1, the thread 231_1 associates and records the exclusion identification information and the secured area.

Figure 5:
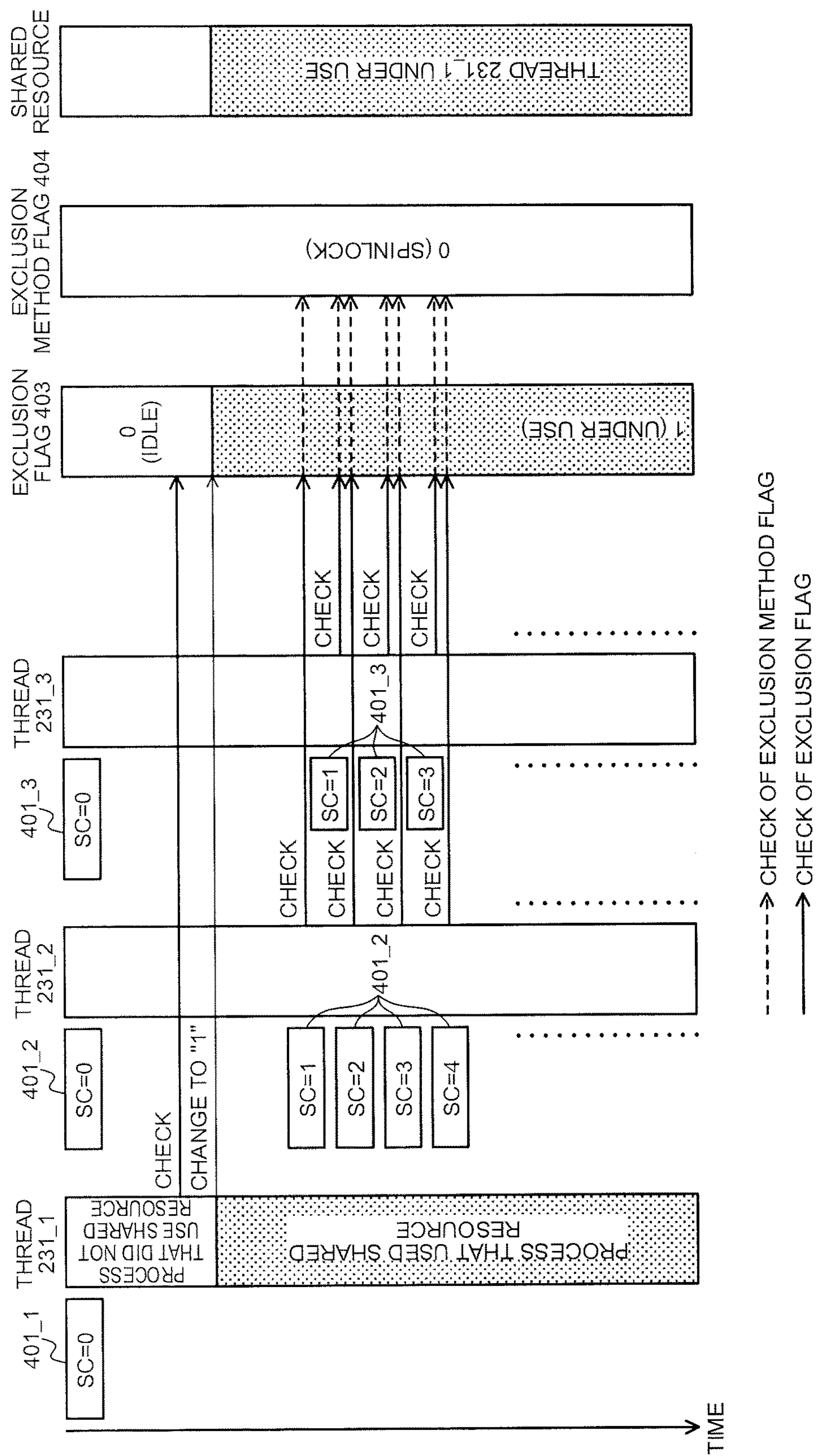
FIG. 5 is an explanatory diagram of an example in which a thread executes a process on shared resources.

FIG. 5 is an explanatory diagram of an example in which a thread executes a process on shared resources. For example, the thread 231_1 acquires the state of the exclusion flag 403 to check the exclusion flag 403. In this example, finding that the exclusion flag 403 is 0, for example, the thread 231_1 changes the state of the exclusion flag 403 from 0 (released state) to 1 (under use). For example, the thread 231_1 sets the SC 401_1 to 0.

For example, the thread 231_2 acquires the state of the exclusion flag 403 to check the exclusion flag 403. Finding that the exclusion flag 403 is 1 (under use), the thread 231_2 acquires the state of an exclusion method flag 404 to check the exclusion method flag 404. Finding that the exclusion method flag 404 is 0 (spinlock), the thread 231_2 increases the value of the SC 401_2 by 1, thereby setting the value of the SC 401_2 to 1. The thread 231_2 then repeats checking the exclusion flag 403 and the exclusion method flag 404. As the exclusion flag 403 remains 1 (under use) and the exclusion method flag 404 remains 0 (spinlock), the thread 231_2 repeatedly increments the value of the SC 401_2.

For example, the thread 231_3 acquires the state of the exclusion flag 403 to check the exclusion flag 403. Finding that the exclusion flag 403 is 1 (under use), the thread 231_3 acquires the state of an exclusion method flag 404 to check the exclusion method flag 404. Finding that the exclusion method flag 404 is 0 (spinlock), the thread 231_3 increases the value of the SC 401_3 by 1, thereby setting the value of the SC 401_3 to 1. The thread 231_3 then repeats checking the exclusion flag 403 and the exclusion method flag 404. As the exclusion flag 403 remains 1 (under use) and the exclusion method flag 404 remains 0 (spinlock), the thread 231_3 repeatedly increments the value of the SC 401_3.

FIG. 6 is an explanatory diagram of an example of a process executed when timer interruption occurs. When the OS 221_1 receives timer interruption, for example, the OS 221_1 selects exclusion identification information. For example, the OS 221_1 (1) acquires the state of the exclusion flag 403, based on the reference information 405 associated with the selected exclusion identification information, and checks the exclusion flag 403. Finding that the exclusion flag 403 is 1 (under use), for example, the OS 221_1 (2) acquires the state of the exclusion method flag 404 to check the exclusion method flag 404.

For example, finding that the exclusion method flag 404 is 0 (spinlock), the OS 221_1 detects values of all spinlock counters, and (3) calculates the average of counter values other than 0. In this example, the value of the SC 401_1 is 0, the value of the SC 401_2 is 300, and the value of the SC 401_3 is 296. The average is therefore calculated at 298. For example, the OS 221_1 determines (4) if the calculated average is greater than or equal to a given number, which is, in this example, determined to be 280. Finding that the calculated average is greater than or equal to the given number, for example, the OS 221_1 (5) changes the value of the exclusion method flag 404 from 0 (spinlock) to 1 (trylock). Although the OS 221_1 determines whether the calculated average is greater than or equal to the given number in this example, not limited hereto, the OS 221_1 may determine if the median is greater than or equal to the given number or may determine whether the counters having a value that is greater than or equal to the given number is a given number or more.

FIG. 7 is an explanatory diagram of an example of execution of trylock. For example, the thread 231_2 acquires the state of the exclusion flag 403 to check the exclusion flag 403. Finding that the exclusion flag 403 is 1 (under use), the thread 231_2 acquires the state of the exclusion method flag 404 to check the exclusion method flag 404. Finding that the exclusion method flag 404 is 1 (trylock), the thread 231_2 specifies exclusion identification information and requests the OS 221_2 to execute trylock.

The OS 221_2 registers identification information of thread 231_2 into a flag stand-by queue 406 corresponding to the exclusion identification information from the thread 231_2 received by the OS 221_2. The OS 221_2 acquires the current time and sets the stand-by start time register 402_2 of the thread 231_2 to the current time. Thus, the stand-by start time register 402_2 registers 15:00:10. The OS 221_2 then performs rescheduling. Because only the thread 231_2 is assigned to the OS 221_2, the OS 221_2 is put in a stand-by state.

For example, the thread 231_3 acquires the state of the exclusion flag 403 to check the exclusion flag 403. Finding that the exclusion flag 403 is 1 (under use), the thread 231_3 acquires the state of the exclusion method flag 404 to check the exclusion method flag 404. Finding that the exclusion method flag 404 is 1 (trylock), the thread 231_3 specifies exclusion identification information and requests the OS 221_3 to execute trylock.

The OS 221_3 registers identification information of thread 231_3 into a flag stand-by queue 406 corresponding to the identification information from the thread 231_3 received by the OS 221_3. The OS 221_3 acquires the current time and sets the stand-by start time register 402_3 of the thread 231_3 to the current time. Thus, the stand-by start time register 402_3 registers 15:00:10. The OS 221_3 then performs rescheduling. Because only the thread 231_3 is assigned to the OS 221_3, the OS 221_3 is put in a stand-by state.

Figure 8:
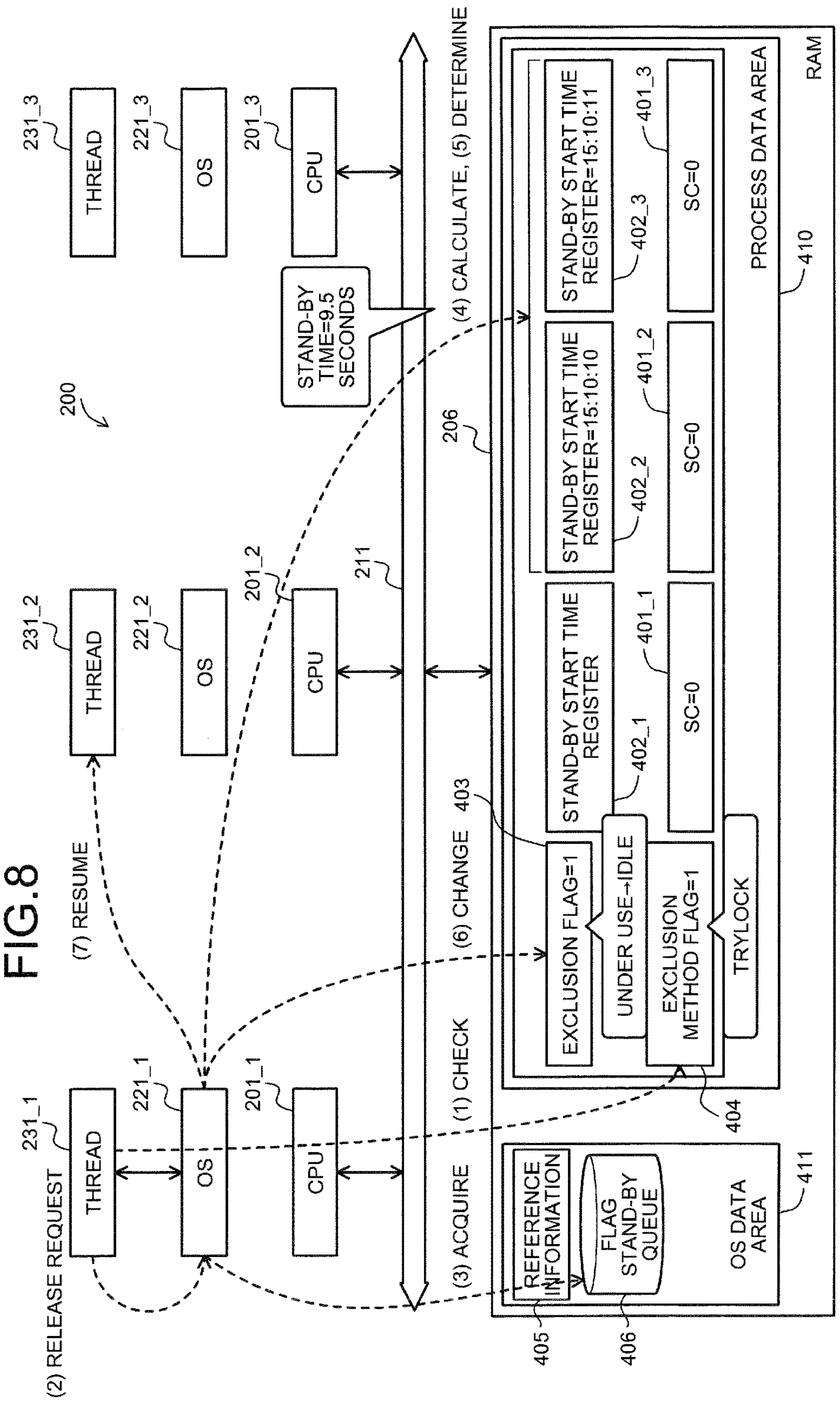
FIG. 8 is an explanatory diagram of an example of the end of an exclusion process by a thread 231_1.

FIG. 8 is an explanatory diagram of an example of the end of an exclusion process by the thread 231_1. For example, the thread 231_1 acquires the state of the exclusion method flag 404 to check (1) the exclusion flag 403. Finding that the exclusion method flag 404 indicates trylock, for example, the thread 231_1 (2) specifies exclusion identification information and sends a release request to the OS 221_1. When receiving the release request, the OS 221_1 acquires the current time. For example, the OS 221_1 (3) acquires thread identification information registered in the flag stand-by queue 406. In this example, the OS 221_1 (3) acquires identification information of the thread 231_2 and of the thread 231_3.

For example, the OS 221_1 acquires times from the stand-by start time registers of the threads indicated by the acquired thread identification information. For example, the OS 221_1 (4) calculates differences (stand-by times) of the current time and the acquired times, and calculates an average stand-by time from the differences calculated for respective acquired times. The current time is 15:10:20, the value of the stand-by start time register 402_2 is 15:10:10, and the value of the stand-by start time register 402_3 is 15:10:11. Thus, the average stand-by time is calculated at 9.5 seconds.

For example, the OS 221_1 (5) determines if the calculated average stand-by time is less than or equal to a given period, which is, in this example, determined to be 3 seconds. Because the calculated average stand-by time is not less than or equal to the given period, trylock is maintained. Although the OS 221_1 determines if the average stand-by time is less than or equal to the given period in this example, not limited hereto, the OS 221_1 may determine if the median of the stand-by times is less than or equal to the given period or may determine if the number of cases of the stand-by time being less than or equal to the given period is a given number. If the calculated average stand-by time is less than or equal to the given period (not depicted), the exclusion method is changed from trylock to spinlock.

For example, the OS 221_1 (6) changes the value of the exclusion flag 403 from 1 (under use) to 0 (released state). For example, the OS 221_1 (7) resumes execution of the thread 231_2 whose identification information is at the head of the flag stand-by queue.

FIG. 9 is an explanatory diagram of an example of the start of an exclusion process by the thread 231_2. For example, the thread 231_2 acquires the state of the exclusion flag 403 to check the exclusion flag 403. Finding that the exclusion flag 403 is 1 (under use), the thread 231_2 acquires the state of an exclusion method flag 404 to check the exclusion method flag 404. Finding that the exclusion method flag 404 is 1 (trylock), the thread 231_2 specifies exclusion identification information and requests the OS 221_2 to execute trylock.

Figure 10:
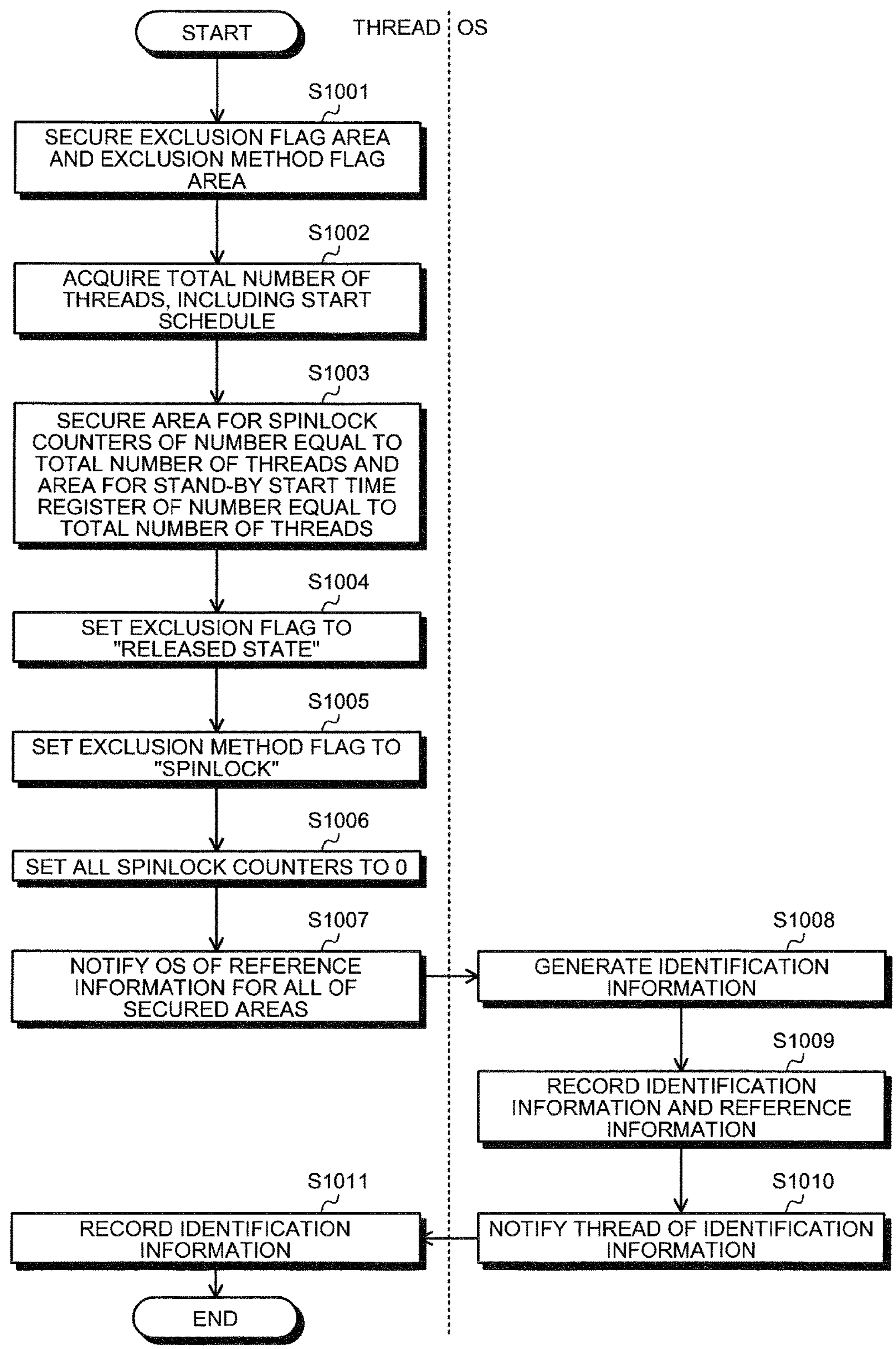
FIG. 10 is a flowchart of an example of an exclusive control generation procedure by an OS and a thread.
Figure 14:
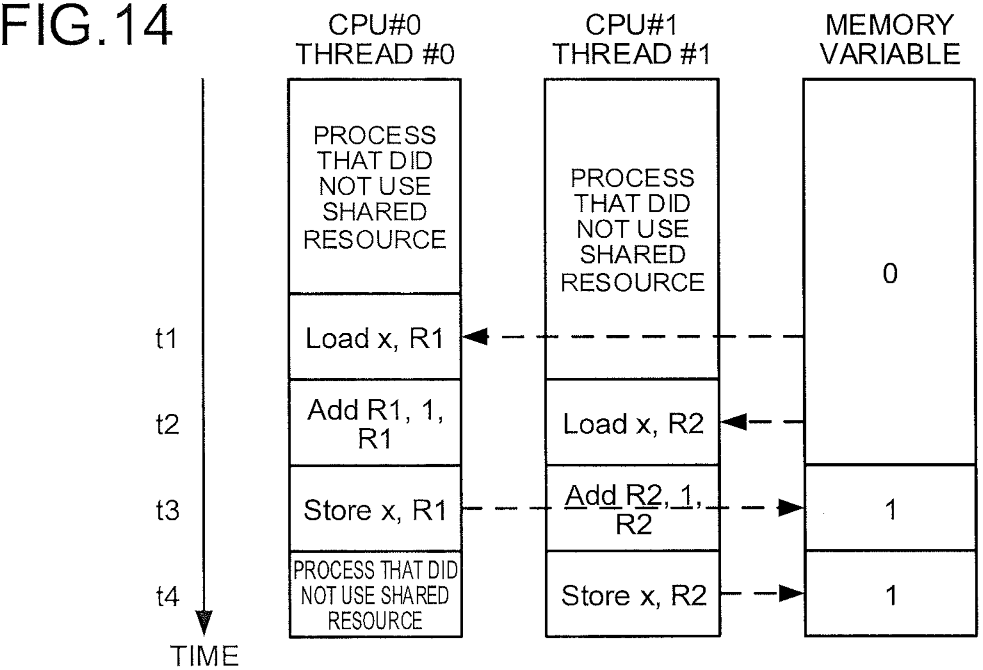
FIG. 14 is an explanatory diagram of an example of access of shared resources in a multi-core processor system.
Figure 15:
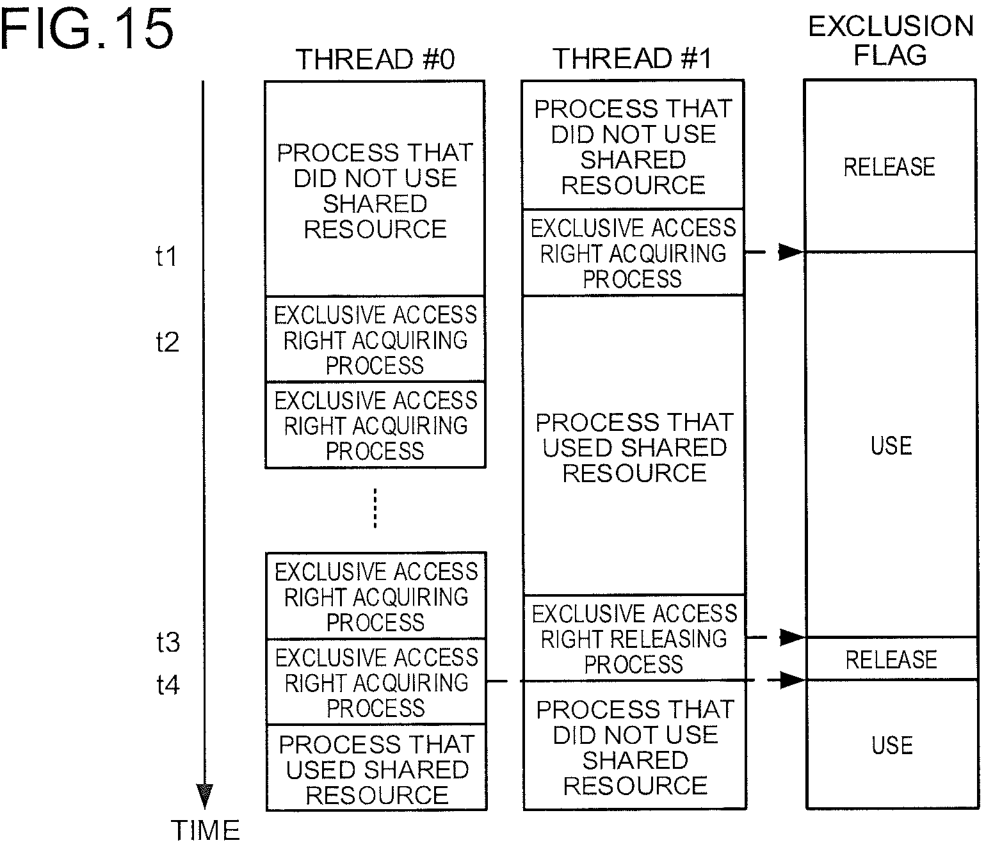
FIG. 15 is an explanatory diagram of an example of spinlock.
Figure 16:
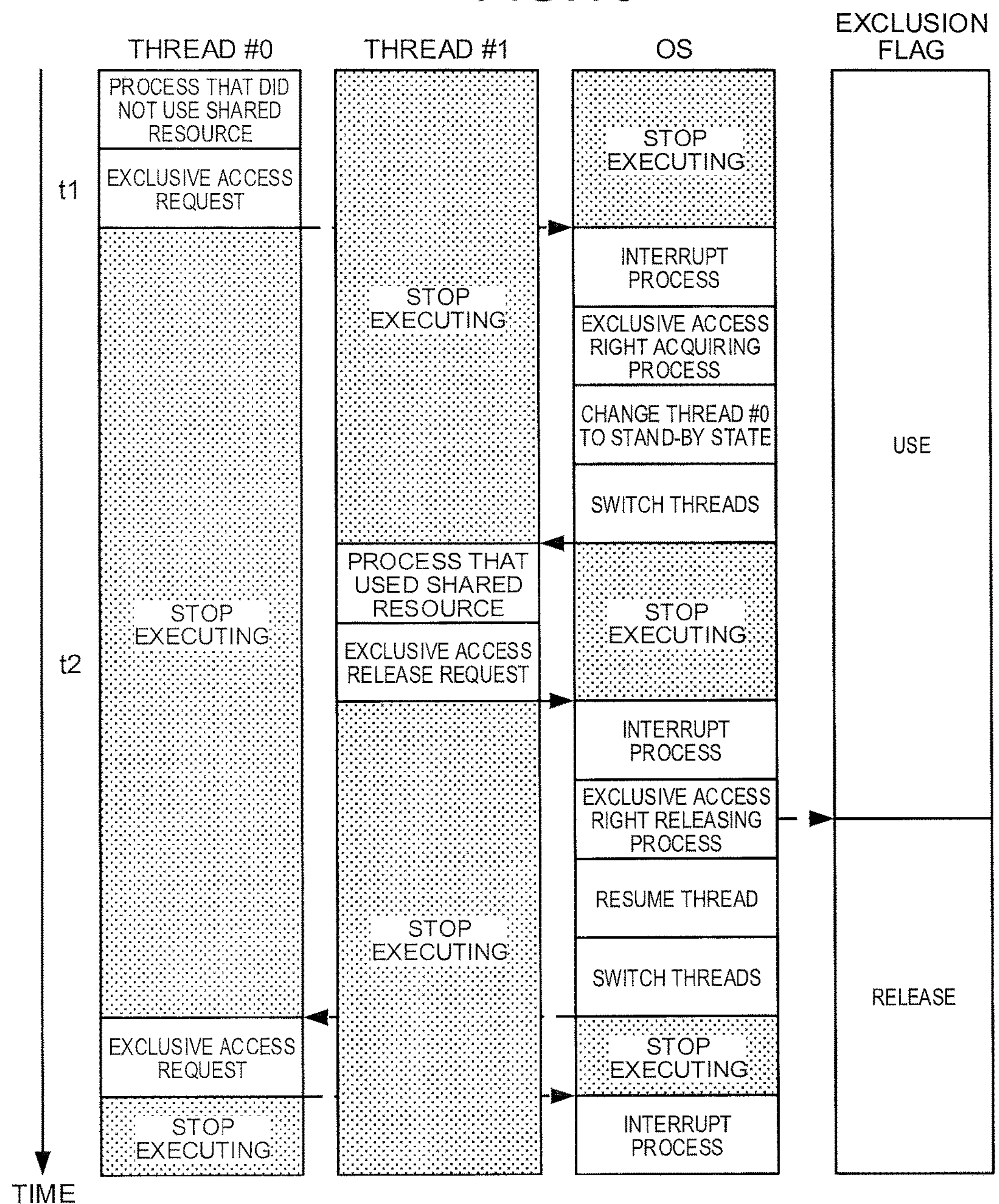
FIG. 16 is an explanatory diagram of an example of trylock.

FIG. 10 is a flowchart of an example of an exclusive control generation procedure by an OS and a thread. The thread secures an exclusion flag area and an exclusion method flag area (step S1001), acquires the total number of threads, including a start schedule (step S1002), and secures an area for spinlock counters of a number equal to the total number of threads and an area for stand-by start time registers of a number equal to the total number of threads (step S1003).

The thread sets the exclusion flag to "released state" (step S1004) and sets the exclusion method flag to "spinlock" (step S1005). Although the exclusion method flag is set to "spinlock" in this example, the exclusion method flag may be set to "trylock". The thread sets all spinlock counters to 0 (step S1006), and notifies the OS of reference information for all of the secured areas (step S1007).

When receiving the reference information, the OS generates exclusion identification information related to the reference information (step S1008), records the exclusion identification information and the reference information (step S1009), and notifies the thread, from which the reference information is transmitted originally, of the exclusion identification information (step S1010). When receiving the exclusion identification information, the thread records the identification information (step S1011), and ends the series of operations.

FIG. 11 is a flowchart of an example of a procedure executed when exclusive access control by an OS and a thread is started. The thread determines if the thread is accessing shared resources or recovering from a stand-by state (step S1101). If the thread has not started access of the shared resources and has not recovered from the stand-by state (step S1101: NO), the thread returns to step S1101.

If the thread has started access of the shared resources or has recovered from the stand-by state (step S1101: YES), the thread acquires the state of an exclusion flag (step S1102), and determines whether the state of the exclusion flag is "under use" (step S1103). If the state of the exclusion flag is not "under use" (step S1103: NO), the thread changes the state of the exclusion flag to "under use" through a special command (step S1104). The thread determines whether the state of the exclusion flag has been successfully changed to "under use" (step S1105). If the state of the exclusion flag has been successfully changed to "under use" (step S1105: YES), the thread sets the spinlock counter to 0 (step S1106).

If the state of the exclusion flag is "under use" (step S1103: YES), or if the state of the exclusion flag is not successfully changed to "under use" (step S1105: NO), the thread acquires the state of an exclusion method flag (step S1107). The thread then determines whether the exclusion method is the spinlock method (step S1108). If the exclusion method is the spinlock method (step S1108: YES), the thread increments the value of the spinlock counter (step S1110), and returns to step S1101. If the exclusion method is not the spinlock method (step S1108: NO), the thread specifies exclusion identification information and sends out a trylock request (step S1109).

Following step S1109, when the OS receives the trylock request from the thread, the OS registers in the flag stand-by queue corresponding to the exclusion identification information, identification information of the thread that made the request (step S1111). The OS acquires the current time (step S1112), and records the current time into the stand-by start time register (step S1113). The OS performs rescheduling (step S1114), and executes an execution thread switching process (step S1115).

FIG. 12 is an example of a procedure executed when exclusive access right is released by an OS and a thread. The thread acquires the state of an exclusion flag (step S1201), and determines whether an exclusion method is the spinlock method (step S1202). If the exclusion method is the spinlock method (step S1202: YES), the thread changes the state of the exclusion flag to an idle state (step S1203), and ends the series of operations.

If the exclusion method is not the spinlock method (step S1202: NO), the thread specifies exclusion identification information and sends a release request to the OS (step S1204). When receiving the release request from the thread, the OS acquires the current time (step S1205). The OS then acquires all identification information of the threads, from the flag stand-by queue corresponding to the exclusion identification information (step S1206).

The OS acquires stand-by start times for the threads indicated by the identification information registered in the flag stand-by queue (step S1207), calculates an average stand-by time (step S1208), and determines whether the average stand-by time is less than or equal to the given period (step S1209). If the average stand-by time is less than or equal to the given period (step S1209: YES), the OS changes the state of the exclusion method flag to "spinlock" (step S1210).

The OS changes the state of the exclusion flag to an idle state (step S1211), resumes execution of all threads indicated by identification information registered in the flag stand-by queue (step S1212), and ends the series of operations. If the average stand-by time is not less than or equal to the given period (step S1209: NO), the OS changes the state of the exclusion flag to a released state (step S1213). The OS resumes execution of a thread indicated by identification information at the head of the flag stand-by queue (step S1214), and ends the series of operations.

FIG. 13 is an example of an exclusive access control procedure executed by the OS when timer interruption occurs. The OS determines whether timer interruption has been received (step S1301). If timer interruption has not been received (step S1301: NO), the OS returns to step S1301. If timer interruption has been received (step S1301: YES), the OS selects exclusion information from among registered exclusion information (step S1302). The OS determines whether selectable exclusion information is not present (step S1303).

If selectable exclusion information is present (step S1303: NO), the OS acquires the state of an exclusion flag (step S1304), and determines whether the state of the exclusion flag is "under use" (step S1305). If the state of the exclusion flag is not "under use" (step S1305: NO), the OS returns to step S1302.

If the state of the exclusion flag is "under use" (step S1305: YES), the OS acquires the state of an exclusion method flag (step S1306) and determines whether the exclusion method is the spinlock method (step S1307). If the exclusion method is not the spinlock method (step S1307: NO), the OS returns to step S1302.

If the exclusion method is the spinlock method (step S1307: YES), the OS acquires all spinlock counter values (step S1308). The OS calculates the average of the spinlock counter values other than 0 (step S1309), and determines if the average is greater than or equal to the given number (step S1310).

If the average is not greater than or equal to the given number (step S1310: NO), the OS returns to step S1302. If the average is greater than or equal to the given number (step S1310: YES), the OS sets the exclusion method flag to "trylock" (step S1311), and proceeds to step S1302.

At step S1303, if the OS determines that selectable exclusion information is not present (step S1303: YES), the OS ends the series of operations. The OS ends the process for exclusive access control but performs an ordinary timer interruption process.

As described, according to the exclusive access control method and the exclusive access control program, when an excluded thread executes the exclusive access control process by the spinlock method and the number of attempts, by the excluded thread, to access the shared resources is greater than or equal to the given number, the OS executes the exclusive access control process by the trylock method. Performing spinlock without using the function of the OS reduces overhead arising during a period between the release of the shared resources and the acquisition of the same. By not calling the OS during spinlock, the number of times that data swapping occurs in the cache is reduced.

The OS secures a memory area for storing in a recording area accessible to the excluded thread, the number of access attempts. As a result, spinlock can be performed without calling the OS.

Information indicating which among the spinlock method and the trylock method, each excluded thread uses to execute the exclusive access control process is managed by an exclusion method flag. As a result, the exclusion method can be switched easily. The OS secures a memory area for storing in a recording area accessible to the excluded thread, the exclusion method flag. As a result, spinlock can be performed without calling the OS.

When multiple excluded threads are present, whether to switch to trylock by the OS is determined based on whether the average of the number of attempts to access the shared resources is greater than or equal to the given number. In this process, how many times excluded threads attempt to make access can be determined relatively.

When the OS executes the exclusive access control process by the trylock method and the time that elapses from an access start time at which the excluded thread accesses the shared resources is shorter than the given period, the thread executes the exclusive access control process by the spinlock method. If exclusive access right to the shared resources is released within a short period, the exclusive access control process for access to the shared resources can be executed by the spinlock method. Performing spinlock without using the function of the OS reduces overhead occurring during a period between the release of the shared resources and the acquisition of the same by a different thread. By not calling the OS during spinlock, the number of times that data swapping occurs in the cache is reduced.

When the elapsed time from the access start time at which the excluded thread accesses the shared resources is greater than or equal to the given period, the OS continues to execute the exclusive access control process by the trylock method. In this manner, if it takes a long time to release the exclusive access right for accessing the shared resources, the exclusive access control process for access to the shared resources can be executed by the trylock method.

The exclusive control method described in the present embodiment may be implemented by executing a prepared program on a computer such as a personal computer and a workstation. The program is stored on a computer-readable recording medium such as a hard disk, a flexible disk, a CD-ROM, an MO (magneto-optical disk), and a DVD, read out from the computer-readable medium, and executed by the computer. The program may be distributed through a network such as the Internet.

According to one aspect of the present invention, an effect of reducing overhead created by an OS is achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An exclusive access control method executed by a computer having an operating system comprising:

counting by at least one second thread of a plurality of threads, a number of attempts by each of the at least one second thread to access a shared resource, the at least one second thread being of a plurality of second threads, the at least one second thread being different from a first thread, and each of the plurality of second threads counting the number of attempts, when the first thread among the plurality of threads executes a second exclusive access control process of allowing the plurality of second threads to attempt to access the shared resource until the plurality of second threads is permitted access;

storing in the memory area by each of the plurality of second threads, each of the number of attempts counted at the counting;

calculating, by the operating system, an average of the counted numbers of attempts of each second thread;

determining, by the operating system, whether the calculated average is at least equal to a predetermined given number; and changing, by the operating system, when the average is at least equal to the given number and upon any of the plurality of second threads attempting to access the shared resource, the second exclusive access control process to a first exclusive access control process of prohibiting the plurality of second threads from attempting to access the shared resource until exclusive access control is released by the first thread, the first exclusive access control process being different from the second exclusive access control process.

2. The exclusive access control method according to claim 1, comprising referring, by the second thread, to information related to the first exclusive access control process or information related to the second exclusive access control process.

3. The exclusive access control method according to claim 1, wherein the second thread attempts to access the shared resource without intervention by the operating system when the first thread executes the second exclusive access control process.

4. An exclusive access control method executed by a computer comprising:

storing in a memory area by each of a plurality of second threads, a number of attempts by each of at least one second thread to access a shared resource, the at least one second thread being of the plurality of second threads, the at least one second thread being different from a first thread, and each of the plurality of second threads counting the number of attempts, when the first thread among a plurality of threads executes an access control process of allowing the plurality of second threads to attempt to access the shared resource until the plurality of second threads is permitted access;

detecting by an operating system, each of the number of attempts stored in the memory area;

calculating, by the operating system and when the second thread is present in plural, an average of the detected numbers of attempts of each second thread;

determining by the operating system, whether the calculated average is at least equal to a predetermined given number; and changing by the operating system, when the average is at least equal to the given number and upon any of the plurality of second threads attempting to access the shared resource, the access control process to a first exclusive access control process of prohibiting the plurality of second threads from attempting to access the shared resource until exclusive access control is released by the first thread, the first access control process being different from the access control process.

5. The exclusive access control method according to claim 4, comprising storing by the operating system and to an area accessed by the threads, execution identification information related to the exclusive access control process of prohibiting the plurality of second threads from attempting to access the shared resource.

6. The exclusive access control method according to claim 4, wherein according to the exclusive access control process of allowing the plurality of second threads to attempt to access the shared resource until permitted access, the plurality of second threads attempts access without intervention by the operating system.

7. An exclusive access control method executed by a computer comprising:

counting by at least one second thread of a plurality of threads, a number of attempts by each of the at least one second thread to access a shared resource, the at least one second thread being of a plurality of second threads, the at least one second thread being different from a first thread, and each of the plurality of second threads counting the number of attempts, when the first thread among the plurality of threads executes a second exclusive access control process of allowing the plurality of second threads to attempt to access the shared resource until the plurality of second threads is permitted access;

storing in the memory area by each of the plurality of second threads, each of the number of attempts counted at the counting;

calculating, by the operating system, an average of the counted numbers of attempts of each second thread;

determining, by the operating system, whether the calculated average is at least equal to a predetermined given number;

changing, by the operating system, when the average is at least equal to the given number and upon any of the plurality of second threads attempting to access the shared resource, the second exclusive access control process to a first exclusive access control process of prohibiting the plurality of second threads from attempting to access the shared resource until exclusive access control is released by the first thread, the first exclusive access control process being different from the second exclusive access control process;

determining, by the operating system and when the first exclusive access control process of prohibiting the plurality of second threads from attempting to access the shared resource until exclusive access control is released is executed upon the plurality of second threads attempting to access the shared resource, whether a period of time elapsing from start of access by the excluded thread to the shared resource is at least a given period; and releasing, by the operating system and when the period of time elapsing from start of access by the excluded thread to the shared resource is less than the given period, prohibition of attempts by the plurality of second threads to access the shared resource.

8. The exclusive access control method according to claim 7, wherein when the period of time elapsing from start of access by the excluded thread to the shared resource is determined to be at least the given period at the determining, the operating system continues to prohibit attempts by the plurality of second threads to access the shared resource.

9. A non-transitory computer-readable recording medium storing an exclusive access control program that causes a computer to execute a process, the computer having an operating system comprising:

counting by at least one second thread of a plurality of threads, a number of attempts by each of the at least one second thread to access a shared resource, the at least one second thread being of a plurality of second threads, the at least one second thread being different from a first thread, and each of the plurality of second threads counting the number of attempts, when the first thread among the plurality of threads executes a second exclusive access control process of allowing the plurality of second threads to attempt to access the shared resource until the plurality of second threads is permitted access;

storing in the memory area by each of the plurality of second threads, each of the number of attempts counted at the counting;

calculating, by the operating system, an average of the counted numbers of attempts of each second thread;

determining, by the operating system, whether the calculated average is at least equal to a predetermined number; and changing, by the operating system, when the average is at least equal to the given number and upon any of the plurality of second threads attempting to access the shared resource, the second exclusive access control process to a first exclusive access control process of prohibiting the plurality of second threads from attempting to access the shared resource until exclusive access control is released by the first thread, the first exclusive access control process being different from the second exclusive access control process.

10. The non-transitory computer-readable recording medium according to claim 9, the process comprising referring, by the second thread, to execution identification information related to the first exclusive access control process or information related to the second exclusive access control process.

11. The non-transitory computer-readable recording medium according to claim 9, wherein according to the second exclusive access control process, the plurality of second threads attempts to access the shared resource without intervention by the operating system.

12. A non-transitory computer-readable recording medium storing an exclusive access control program that causes a computer to execute a process comprising:

storing in a memory area by each of a plurality of second threads, a number of attempts by each of at least one second thread to access a shared resource, the at least one second thread being of the plurality of second threads, the at least one second thread being different from a first thread, and each of the plurality of second threads counting the number of attempts, when the first thread among a plurality of threads executes an exclusive access control process of allowing the plurality of second threads to attempt to access the shared resource until the plurality of second threads is permitted access;

detecting by an operating system, each of the number of attempts stored in the memory area;

calculating, by the operating system and when the second thread is present in plural, an average of the detected numbers of attempts of each second thread;

determining by the operating system, whether the calculated average is at least equal to a predetermined given number; and changing, by the operating system, when the average is at least equal to the given number and upon any of the plurality of second threads attempting to access the shared resource, the exclusive access control process to a first exclusive access control process of prohibiting the plurality of second threads from attempting to access the shared resource until exclusive access control is released by the first thread, the first access control process being different from the access control process.

13. The non-transitory computer-readable recording medium according to claim 12, the process comprising storing by the operating system and to an area accessed by the threads, execution identification information related to the exclusive access control process of prohibiting the plurality of second threads from attempting to access the shared resource.

14. The non-transitory computer-readable recording medium according to claim 12, wherein according to the exclusive access control process of allowing the plurality of second threads to attempt to access the shared resource until permitted access, the plurality of second threads attempts access without intervention by the operating system.

* * * * *